(12) United States Patent
Sakurai et al.

(10) Patent No.: US 10,759,944 B2
(45) Date of Patent: Sep. 1, 2020

(54) FILM

(71) Applicant: SUMITOMO CHEMICAL COMPANY, LIMITED, Tokyo (JP)

(72) Inventors: Sayaka Sakurai, Osaka (JP); Hidenori Hanaoka, Osaka (JP); Yasuharu Shimazaki, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/094,410

(22) PCT Filed: Apr. 26, 2017

(86) PCT No.: PCT/JP2017/016589
§ 371 (c)(1),
(2) Date: Oct. 17, 2018

(87) PCT Pub. No.: WO2017/188332
PCT Pub. Date: Nov. 2, 2017

(65) Prior Publication Data
US 2019/0119502 A1 Apr. 25, 2019

(30) Foreign Application Priority Data
Apr. 28, 2016 (JP) .................................. 2016-091408

(51) Int. Cl.
| C09D 5/00 | (2006.01) |
| C09D 183/06 | (2006.01) |
| C09K 3/18 | (2006.01) |
| C09D 183/04 | (2006.01) |
| C08G 77/18 | (2006.01) |

(52) U.S. Cl.
CPC .............. *C09D 5/00* (2013.01); *C08G 77/18* (2013.01); *C09D 183/04* (2013.01); *C09D 183/06* (2013.01); *C09K 3/18* (2013.01)

(58) Field of Classification Search
None
See application file for complete search history.

(56) References Cited

U.S. PATENT DOCUMENTS

| 2005/0096415 A1* | 5/2005 | Akiyama .............. C09D 183/04 524/261 |
| 2011/0015099 A1 | 1/2011 | Xiong et al. |
| 2015/0087771 A1* | 3/2015 | Horstman ............ C09D 183/10 524/588 |
| 2017/0015842 A1 | 1/2017 | Hozumi et al. |
| 2017/0182469 A1* | 6/2017 | Mochizuki ........... B01D 69/125 |
| 2017/0313728 A1 | 11/2017 | Sakurai et al. |

FOREIGN PATENT DOCUMENTS

| JP | 63-6067 A | 1/1988 |
| JP | 9-309889 A | 12/1997 |
| JP | 2002-97192 A | 4/2002 |
| JP | 2002-166506 A | 6/2002 |
| JP | 2014-185334 A | 10/2014 |
| WO | WO 2016/068138 A1 | 5/2016 |

OTHER PUBLICATIONS

International Search Report for PCT/JP2017/016589 dated May 30, 2017.
U.S. Appl. No. 16/066,238, filed Jun. 26, 2018.
Chinese Office Action for Chinese Application No. 201780025511.0, dated Mar. 18, 2020, with an English translation.

* cited by examiner

*Primary Examiner* — Marc S Zimmer
(74) *Attorney, Agent, or Firm* — Birch, Stewart, Kolasch & Birch, LLP

(57) ABSTRACT

The object of the present invention is to provide a polydialkylsiloxane backbone containing film excellent in durability against hot water. The film of the present invention comprises a polydialkylsiloxane backbone, wherein the ratio of carbon atoms to silicon atoms (C/Si) is not less than 0.93 and less than 1.38 in terms of moles. In the film, the magnitude of a contact angle change ratio $d_W$ represented by a specific formula can be not less than −10% provided that $\theta_0$ is an initial contact angle of water, and $\theta_W$ is a contact angle of water on the film immersed in ion-exchanged water of 70° C. for 24 hours.

6 Claims, No Drawings

FILM

TECHNICAL FIELD

The present invention relates to a film comprising a polydialkylsiloxane backbone.

BACKGROUND ART

In various kinds of display devices, optical elements, semiconductor elements, building materials, automobile components, nanoimprint techniques and solar cell members, deposition of liquid droplets on a surface of a substrate may cause a problem of contamination and corrosion of the substrate, or further the deterioration in the performance due to the contamination and corrosion. Therefore, in these fields, the substrate surface is required to have good water repellency.

As such films, Patent Documents 1 and 2 propose a surface-treated layer formed using a surface treatment agent such as $(CH_3)_3SiO(Si(CH_3)_2O)_{46}Si(CH_3)_2(CH_2)_2Si(OCH_3)_3$.

CITATION LIST

Patent Literature

Patent Literature 1: JP 2002-166506 A
Patent Literature 2: JP 2002-97192 A

SUMMARY OF INVENTION

Technical Problem

Heretofore known films having a siloxane bond may have insufficient durability against hot water. The present invention was made in view of the situations described above. The object of the present invention is to provide a polydialkylsiloxane backbone containing film excellent in durability against hot water.

Solution to Problem

The present inventors extensively studied to attain the object described above, and resultantly found, for a film comprising a polydialkylsiloxane backbone, that when the ratio of carbon atoms to silicon atoms (C/Si) contained in a surface of the film is set to a predetermined range, both the adhesion and durability against hot water of the film are improved.

The present invention comprises the following aspects.
[1] A film comprising a polydialkylsiloxane backbone, wherein the ratio of carbon atoms to silicon atoms (C/Si) is not less than 0.93 and less than 1.38 in terms of moles.
[2] The film according to [1], wherein the magnitude of a contact angle change ratio $d_W$ represented by the following formula is not less than −10%:

contact angle change ratio $d_W(\%)=(\theta_W-\theta_0)/\theta_0 \times 100$ provided that $\theta_0$ is an initial contact angle of water, and $\theta_W$ is a contact angle of water on the film immersed in ion-exchanged water of 70° C. for 24 hours.
[3] The film according to [1] or [2], wherein the initial sliding angle of water is not more than 30°.
[4] The film according to any of [1] to [3], comprising a group represented by the formula (s1-1):

[Formula 1]

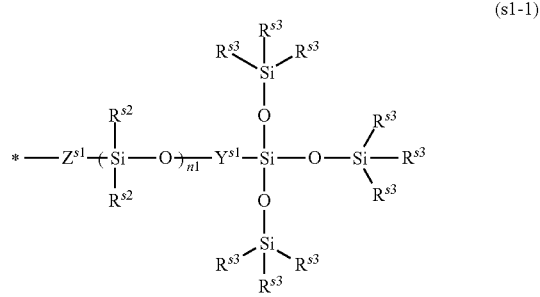

wherein $R^{s2}$ represents an alkyl group with a carbon atom number of 1 to 4; $R^{s3}$ represents an alkyl group with a carbon atom number of 1 to 4; $Z^{s1}$ represents —O— or a divalent hydrocarbon group and —$CH_2$— contained in the divalent hydrocarbon group may be replaced by —O—; $Y^{s1}$ represents a single bond or —$Si(R^{s2})_2$-$L^{s1}$-; $L^{s1}$ represents a divalent hydrocarbon group and —$CH_2$— contained in the divalent hydrocarbon group may be replaced by —O—; and n1 represents an integer of not less than 1.
[5] The film according to any of [1] to [4], wherein the content ratio of Si atoms derived from the polydialkylsiloxane backbone is not more than 70% by mol in Si atoms contained in the film.
[6] The film according to any of [1] to [5], comprising a trialkylsilyl group, wherein the content ratio of Si atoms derived from the trialkylsilyl group is not less than 5% by mol in Si atoms contained in the film.

Advantageous Effects of Invention

The film of the present invention has good durability against hot water because the ratio of carbon atoms to silicon atoms (C/Si) contained in the film falls within a predetermined range.

DESCRIPTION OF EMBODIMENTS

The abundance of each atom in a film surface can be calculated by X-ray photoelectron spectroscopy (XPS). The water repellency or hot water resistance of the film varies depending on the abundance ratios of atoms in the film surface. For example, the water repellency is increased as the abundance ratio of carbon atoms in the film surface is increased. Oxygen atoms or silicon atoms existing in the film surface adsorb water molecules in air and tend to thereby hydrophilize a coating film surface.

The film of the present invention comprises a polydialkylsiloxane backbone, and the ratio of carbon atoms to silicon atoms (C/Si) is not less than 0.93, preferably not less than 1.00, more preferably not less than 1.05, further preferably not less than 1.10. When the ratio of carbon atoms to silicon atoms (C/Si) is in the range as described above, the abundance of the polydialkylsiloxane backbone in the film surface is properly adjusted, so that the contact angle of water can be increased. The resulting surface can have a small sliding angle of water and also small contact angle hysteresis. The ratio of carbon atoms to silicon atoms (C/Si) is less than 1.38, and may be not more than 1.30 or may be not more than 1.25. The increased ratio of carbon atoms to silicon atoms (C/Si) in the film surface can increase the contact angle of water, while reducing the hot water resistance of the film due to the reduced adhesion of the film to a substrate.

Therefore, the ratio of carbon atoms to silicon atoms (C/Si) needs to be adjusted to the proper range as mentioned above.

The ratio of carbon atoms to silicon atoms (C/Si) can be measured by X-ray photoelectron spectroscopy (XPS).

The initial contact angle $\theta_0$ of water on the film of the present invention is preferably not less than 80°, more preferably not less than 90°, further preferably not less than 100°, and may be not more than 140° or may be not more than 130°.

The contact angle means a value measured by a θ/2 method using water in an amount of 3.0 μL.

The initial contact angle hysteresis $\Delta\theta_W$ of water on the film of the present invention is preferably not more than 10°, more preferably not more than 8°, further preferably not more than 5°, and may be not less than 1° or may be not less than 3°.

The initial sliding angle $\alpha_W$ of water on the film of the present invention is preferably not more than 30°, more preferably not more than 25°, further preferably not more than 20°, and may be not less than 1° and may be not less than 5°.

The contact angle hysteresis $\Delta\theta_W$ and sliding angle $\alpha_W$ of water can be measured by a slide-falling method using water in an amount of 6.0 μL. In the present specification, initial means a state before treatment of the film.

A reduction in the contact angle change ratio dw represented by the following formula is preferably not more than −10%, more preferably not more than −5%, further preferably not more than −3%, preferably 0%, and may be not more than −0.1% or may be not more than −0.5%:

contact angle change ratio $d_w(\%)=(\theta_w-\theta_0)/\theta_0\times100$ provided that $\theta_w$ is a contact angle on the film after immersion in ion-exchanged water of 70° C. for 24 hours.

The film of the present invention comprises a polysiloxane backbone and particularly comprises a polydialkylsiloxane backbone. The polysiloxane backbone represents a backbone in which silicon atoms and oxygen atoms are alternately arranged, and silicon atoms are three-dimensionally connected through oxygen atoms. The polydialkylsiloxane backbone represents a backbone in which silicon atoms to which two alkyl groups are bonded, and oxygen atoms are alternately arranged. The polysiloxane backbone (particularly, the polydialkylsiloxane backbone) improves the chemical and physical durability and transparency of the film.

Examples of the polydialkylsiloxane backbone include polydimethylsiloxane backbone and polydiethylsiloxane backbone, and a polydimethylsiloxane backbone is preferred.

In the film of the present invention, Si atoms derived from the polydialkylsiloxane backbone are preferably not less than 10% by mol, more preferably not less than 15% by mol, further preferably not less than 20% by mol, and preferably not more than 70% by mol, more preferably not more than 60% by mol, further preferably not more than 55% by mol, in the total of silicon atoms contained in the film.

The ratio (in terms of moles) of the Si atoms derived from the polydialkylsiloxane backbone in the total of Si atoms contained in the film can be measured by $^{29}$Si-NMR.

The film of the present invention is preferably formed with a polysiloxane backbone and may have a structure in which a divalent hydrocarbon group is interposed between silicon atoms.

The film of the present invention preferably comprises a trialkylsilyl group. In the film of the present invention, Si atoms derived from the trialkylsilyl group are preferably not less than 3% by mol, more preferably not less than 5% by mol, further preferably not less than 6.5% by mol, and may be not more than 20% by mol or may be not more than 15% by mol, in the total of silicon atoms contained in the film.

The ratio (in terms of moles) of the Si atoms derived from the trialkylsilyl group in the total of Si atoms contained in the film can be measured by $^{29}$Si-NMR.

The film of the present invention preferably comprises the trialkylsilyl group as a monovalent group having a molecular chain with an end to which a trialkylsilyl containing group is bonded (hereinafter, sometimes referred to as a "trialkylsilyl containing molecular chain"). Existence of a trialkylsilyl containing molecular chain in the film easily improves the water repellency of the film, while increasing the chemical and physical durability and also easily improving the durability against hot water. The water repellency at a film interface (surface) can also be improved in the case where the alkyl groups in the trialkylsilyl containing group are replaced by fluoroalkyl groups.

From the viewpoint that durability against hot water can be further improved, the trialkylsilyl containing group is a group containing at least one trialkylsilyl group and preferably contains not less than 2, further preferably 3 trialkylsilyl groups.

The trialkylsilyl containing group is preferably a group represented by the formula (s1).

[Formula 2]

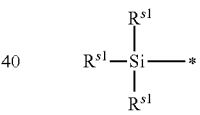

(s1)

wherein $R^{s1}$ represents a hydrocarbon group or trialkylsilyloxy group and hydrogen atoms contained in the hydrocarbon group or trialkylsilyloxy group may be replaced by fluorine atoms, provided that $R^{s1}$ is an alkyl group when all $R^{s1}$ are hydrocarbon groups; and * represents a bond.

The carbon number of the hydrocarbon group represented by $R^{s1}$ is preferably 1 to 4, more preferably 1 to 3, further preferably 1 or 2. When all $R^{s1}$ are hydrocarbon groups, the total carbon number of the three $R^{s1}$ is preferably not more than 9, more preferably not more than 6, further preferably not more than 4.

The hydrocarbon group represented by $R^{s1}$ is preferably an aliphatic hydrocarbon group, more preferably an alkyl group. Examples of the alkyl group include methyl group, ethyl group, propyl group and butyl group. A plurality of $R^{s1}$ may be the same or different and is preferably the same. Preferably, at least one of the three $R^{s1}$ is a methyl group. More preferably, at least two thereof are methyl groups. Especially preferably, all the three $R^{s1}$ are methyl groups.

Hydrogen atoms contained in the trialkylsilyl group and trialkylsilyloxy group represented by $R^{s1}$ may be replaced by fluorine atoms. The number of the replacing fluorine atoms is preferably not less than 1, more preferably not less than 3, and preferably not more than 2×A+1 where A is the number of carbon atoms. When hydrogen atoms contained in the alkyl group are replaced by fluorine atoms, the number of the alkyl groups to be substituted can be appropriately selected within the range of 1 to 3 per one silicon atom.

Specific examples of the group in which all $R^{s1}$ are hydrocarbon groups (alkyl groups) (trialkylsilyl group) include groups represented by the following formulae.

[Formula 3]

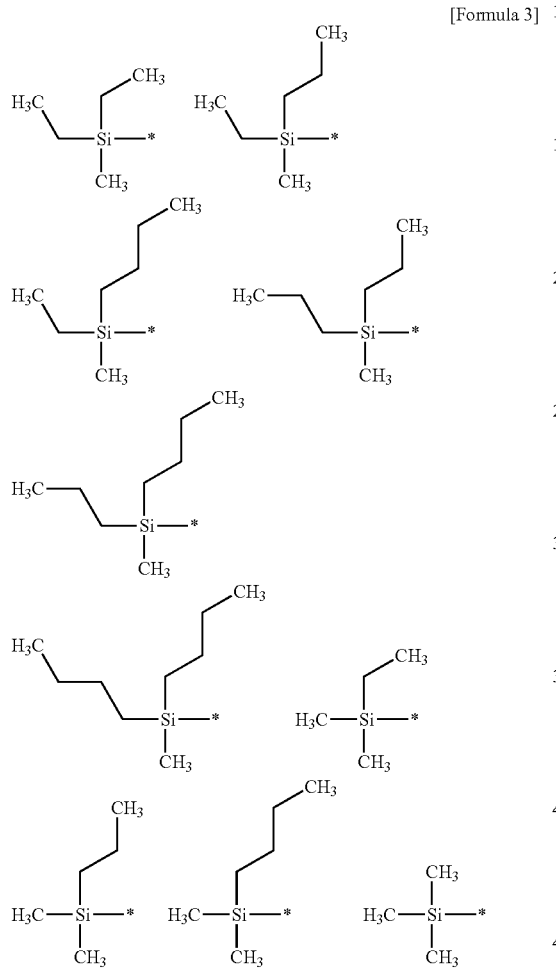

wherein * represents a bond.

Examples of the trialkylsilyloxy group represented by $R^{s1}$ include a group in which all $R^{s1}$ are hydrocarbon groups (alkyl groups) (trialkylsilyl group), and —O— is bonded to silicon atoms of the trialkylsilyl group.

Examples of the group in which at least one of $R^{s1}$ is a trialkylsilyloxy group include groups represented by the following formulae.

[Formula 4]

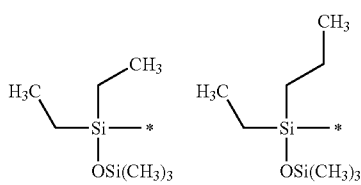

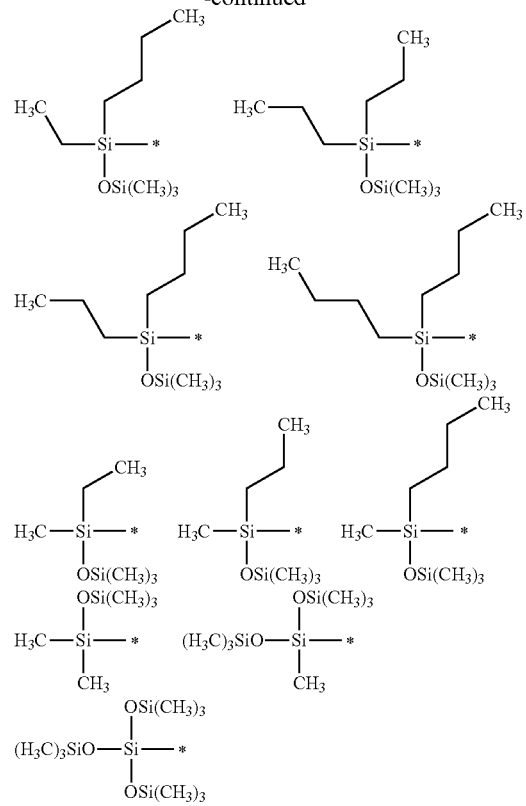

It is preferred that in the trialkylsilyl containing molecular chain, the trialkylsilyl group is bonded to one end (free end side) of the molecular chain, particularly to one end (free end side) of the main chain (longest linear chain) of the molecular chain.

The trialkylsilyl containing molecular chain is preferably linear or branched, more preferably linear. The molecular chain preferably comprises a dialkylsiloxane chain and more preferably comprises a linear dialkylsiloxane chain. The molecular chain may contain a divalent hydrocarbon group. Even when a part of the molecular chain is a divalent hydrocarbon group, the other part remains as a dialkylsiloxane chain, and therefore the resulting film has good chemical and physical durability.

The molecular chain is preferably a group represented by the formula (s2).

[Formula 5]

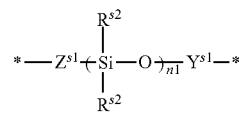

(s2)

wherein $R^{s2}$ represents an alkyl group with a carbon atom number of 1 to 4; $Z^{s1}$ represents —O— or a divalent hydrocarbon group and —CH$_2$— contained in the divalent hydrocarbon group may be replaced by —O—; $Y^{s1}$ represents a single bond or —Si($R^{s2}$)$_2$-L$^{s1}$-; $L^{s1}$ represents a divalent hydrocarbon group and —CH$_2$— contained in the divalent hydrocarbon group may be replaced by —O—; the symbol * on the left side represents a bond with a silicon atom; the symbol * on the right side represents a bond with a trialkylsilyl containing group; and n1 represents an integer of not less than 1.

The carbon number of the alkyl group represented by $R^{s2}$ is preferably 1 to 4, more preferably 1 to 3, further preferably 1 or 2. Examples of the alkyl group represented by $R^{s2}$ include methyl group, ethyl group, propyl group and butyl group, and a methyl group or ethyl group is preferred, with a methyl group being especially preferred.

n1 is preferably 1 to 100, more preferably 1 to 80, further preferably 1 to 50, especially preferably 1 to 30.

The carbon number of the divalent hydrocarbon group represented by $Z^{s1}$ or $L^{s1}$ is preferably 1 to 10, more preferably 1 to 6, further preferably 1 to 4. The divalent hydrocarbon group is preferably in a chain form, and the chain may be linear or branched.

The divalent hydrocarbon group is preferably a divalent aliphatic hydrocarbon group, and preferably an alkanediyl group. Examples of the divalent hydrocarbon group include methylene group, ethylene group, propylene group and butylene group.

A part of —$CH_2$— contained in the divalent hydrocarbon group may be replaced by —O—. In this case, two continuous —$CH_2$— are not simultaneously replaced by —O—, and —$CH_2$— adjacent to a Si atom is not replaced by —O—. When not less than two —$CH_2$— are replaced by —O—, the carbon atom number between —O— and —O— is preferably 2 to 4, more preferably 2 to 3. Specific examples of the group in which a part of the divalent hydrocarbon group is replaced by —O— may include groups having (poly)ethylene glycol units and groups having (poly)propylene glycol units.

Preferably, in the formula (s2), $Z^{s1}$ is —O—, and $Y^{s1}$ is a single bond, i.e., the molecular chain is composed only of repeating dialkylsilyloxy groups. When the dialkylsiloxane chain is composed only of repeating dialkylsilyloxy groups, the resulting film has good chemical and physical durability.

Examples of the molecular chain contained in the trialkylsilyl containing molecular chain include molecular chains represented by the following formulae.

[Formula 6]

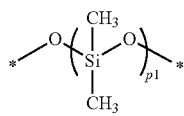

[Formula 7]

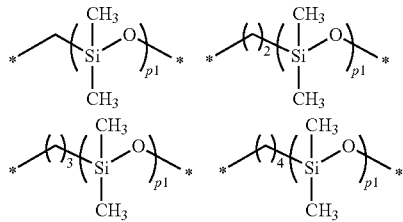

[Formula 8]

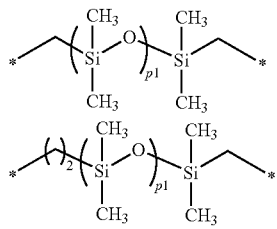

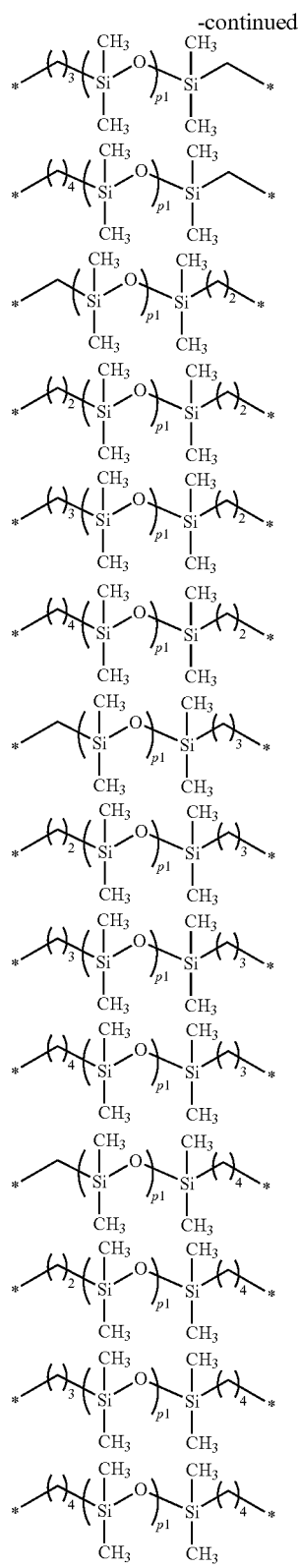

wherein p1 represents an integer of 1 to 30, and * represents a bond that is bonded to a silicon atom or a trialkylsilyl group forming a polysiloxane backbone.

The total number of atoms forming the trialkylsilyl containing molecular chain is preferably not less than 24, more preferably not less than 40, further preferably not less than 50, and preferably not more than 1200, more preferably not more than 700, further preferably not more than 250.

The trialkylsilyl containing molecular chain is preferably a group represented by the following formula (s1).

[Formula 9]

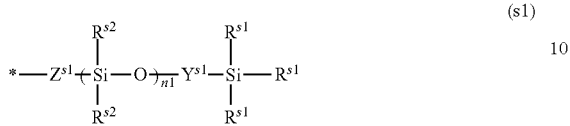
(s1)

wherein $R^{s1}$, $R^{s2}$, $Z^{s1}$, $Y^{s1}$ and n1 respectively represent the same meaning as above, and * represents a bond with a silicon atom.

The trialkylsilyl containing molecular chain is more preferably a group represented by the following formula (s1-1), further preferably a group represented by the following formula (s1-1-1).

[Formula 10]

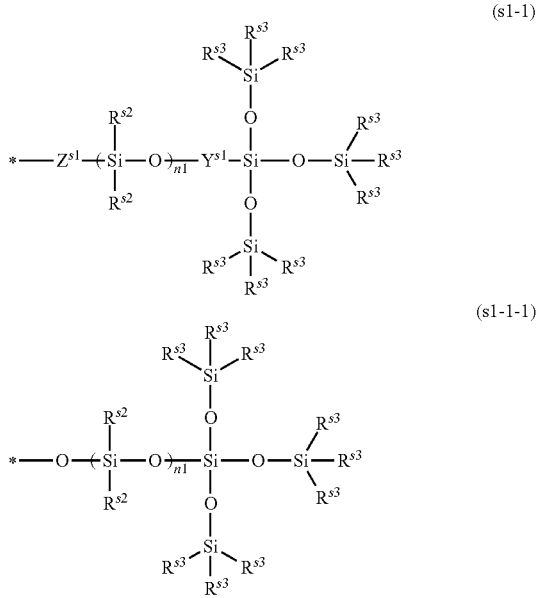
(s1-1)

(s1-1-1)

wherein $R^{s2}$, $Y^{s1}$, $Z^{s1}$ and n1 respectively represent the same meaning as above; $R^{s3}$ represents an alkyl group with a carbon atom number of 1 to 4; and * represents a bond with a silicon atom.

The trialkylsilyl containing molecular chain is also preferably a group represented by the following formula (s1-2), further preferably a group represented by the following formula (s1-2-1).

[Formula 11]

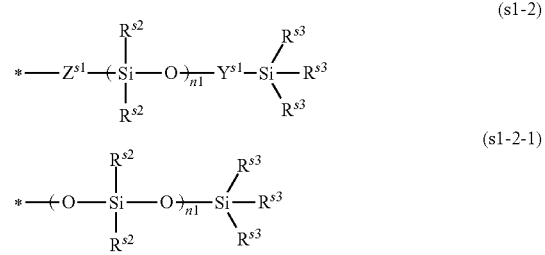
(s1-2)

(s1-2-1)

wherein $R^{s2}$, $R^{s3}$, $Y^{s1}$, $Z^{s1}$ and n1 respectively represent the same meaning as above, and * represents a bond with a silicon atom.

Examples of the alkyl group represented by $R^{s3}$ include groups similar to the alkyl groups shown as examples of the hydrocarbon group represented by $R^{s1}$. The carbon number of the alkyl group is preferably 1 to 3, more preferably 1 or 2. The total carbon number of $R^{s3}$ contained in *—Si($R^{s3}$)$_3$ is preferably not more than 9, more preferably not more than 6, further preferably not more than 4.

Preferably, at least one of $R^{s3}$ contained in *—Si($R^{s3}$)$_3$ is a methyl group. More preferably, not less than two $R^{s3}$ are methyl groups. Especially preferably, all the three $R^{s3}$ are methyl groups.

Examples of the trialkylsilyl containing molecular chain include groups represented by the formula (s1-I).

[Formula 12]

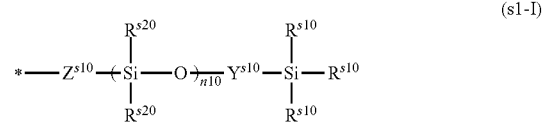
(s1-I)

TABLE 1

| | $Z^{s10}$ | $R^{s20}$ | n10 | $Y^{s10}$ | $R^{s10}$ |
|---|---|---|---|---|---|
| (s1-I-1) | *—O—* | $CH_3$—* | 1~30 | — | $(CH_3)_3SiO$—* |
| (s1-I-2) | *—O—* | $CH_3$—* | 1~30 | *—Si$(CH_3)_2$—$CH_2$—* | $(CH_3)_3SiO$—* |
| (s1-I-3) | *—O—* | $CH_3$—* | 1~30 | *—Si$(CH_3)_2$—$(CH_2)_2$—* | $(CH_3)_3SiO$—* |
| (s1-I-4) | *—O—* | $CH_3$—* | 1~30 | *—Si$(CH_3)_2$—$(CH_2)_3$—* | $(CH_3)_3SiO$—* |
| (s1-I-5) | *—O—* | $CH_3$—* | 1~30 | *—Si$(CH_3)_2$—$(CH_2)_4$—* | $(CH_3)_3SiO$—* |
| (s1-I-6) | *—$CH_2$—* | $CH_3$—* | 1~30 | — | $(CH_3)_3SiO$—* |
| (s1-I-7) | *—$CH_2$—* | $CH_3$—* | 1~30 | *—Si$(CH_3)_2$—$CH_2$—* | $(CH_3)_3SiO$—* |
| (s1-I-8) | *—$CH_2$—* | $CH_3$—* | 1~30 | *—Si$(CH_3)_2$—$(CH_2)_2$—* | $(CH_3)_3SiO$—* |
| (s1-I-9) | *—$CH_2$—* | $CH_3$—* | 1~30 | *—Si$(CH_3)_2$—$(CH_2)_3$—* | $(CH_3)_3SiO$—* |
| (s1-I-10) | *—$CH_2$—* | $CH_3$—* | 1~30 | *—Si$(CH_3)_2$—$(CH_2)_4$—* | $(CH_3)_3SiO$—* |
| (s1-I-11) | *—$(CH_2)_2$—* | $CH_3$—* | 1~30 | — | $(CH_3)_3SiO$—* |
| (s1-I-12) | *—$(CH_2)_2$—* | $CH_3$—* | 1~30 | *—Si$(CH_3)_2$—$CH_2$—* | $(CH_3)_3SiO$—* |
| (s1-I-13) | *—$(CH_2)_2$—* | $CH_3$—* | 1~30 | *—Si$(CH_3)_2$—$(CH_2)_2$—* | $(CH_3)_3SiO$—* |
| (s1-I-14) | *—$(CH_2)_2$—* | $CH_3$—* | 1~30 | *—Si$(CH_3)_2$—$(CH_2)_3$—* | $(CH_3)_3SiO$—* |
| (s1-I-15) | *—$(CH_2)_2$—* | $CH_3$—* | 1~30 | *—Si$(CH_3)_2$—$(CH_2)_4$—* | $(CH_3)_3SiO$—* |
| (s1-I-16) | *—$(CH_2)_3$—* | $CH_3$—* | 1~30 | — | $(CH_3)_3SiO$—* |
| (s1-I-17) | *—$(CH_2)_3$—* | $CH_3$—* | 1~30 | *—Si$(CH_3)_2$—$CH_2$—* | $(CH_3)_3SiO$—* |

TABLE 1-continued

| | $Z^{s10}$ | $R^{s20}$ | n10 | $Y^{s10}$ | $R^{s10}$ |
|---|---|---|---|---|---|
| (s1-I-18) | *—(CH$_2$)$_3$—* | CH$_3$—* | 1~30 | *—Si(CH$_3$)$_2$—(CH$_2$)$_2$—* | (CH$_3$)$_3$SiO—* |
| (s1-I-19) | *—(CH$_2$)$_3$—* | CH$_3$—* | 1~30 | *—Si(CH$_3$)$_2$—(CH$_2$)$_3$—* | (CH$_3$)$_3$SiO—* |
| (s1-I-20) | *—(CH$_2$)$_3$—* | CH$_3$—* | 1~30 | *—Si(CH$_3$)$_2$—(CH$_2$)$_4$—* | (CH$_3$)$_3$SiO—* |
| (s1-I-21) | *—(CH$_2$)$_4$—* | CH$_3$—* | 1~30 | — | (CH$_3$)$_3$SiO—* |
| (s1-I-22) | *—(CH$_2$)$_4$—* | CH$_3$—* | 1~30 | *—Si(CH$_3$)$_2$—CH$_2$—* | (CH$_3$)$_3$SiO—* |
| (s1-I-23) | *—(CH$_2$)$_4$—* | CH$_3$—* | 1~30 | *—Si(CH$_3$)$_2$—(CH$_2$)$_2$—* | (CH$_3$)$_3$SiO—* |
| (s1-I-24) | *—(CH$_2$)$_4$—* | CH$_3$—* | 1~30 | *—Si(CH$_3$)$_2$—(CH$_2$)$_3$—* | (CH$_3$)$_3$SiO—* |
| (s1-I-25) | *—(CH$_2$)$_4$—* | CH$_3$—* | 1~30 | *—Si(CH$_3$)$_2$—(CH$_2$)$_4$—* | (CH$_3$)$_3$SiO—* |

TABLE 2

| | $Z^{s10}$ | $R^{s20}$ | n10 | $Y^{s10}$ | $R^{s10}$ |
|---|---|---|---|---|---|
| (s1-I-26) | *—O—* | CH$_3$—* | 1~30 | — | CH$_3$—* |
| (s1-I-27) | *—O—* | CH$_3$—* | 1~30 | *—Si(CH$_3$)$_2$—CH$_2$—* | CH$_3$—* |
| (s1-I-28) | *—O—* | CH$_3$—* | 1~30 | *—Si(CH$_3$)$_2$—(CH$_2$)$_2$—* | CH$_3$—* |
| (s1-I-29) | *—O—* | CH$_3$—* | 1~30 | *—Si(CH$_3$)$_2$—(CH$_2$)$_3$—* | CH$_3$—* |
| (s1-I-30) | *—O—* | CH$_3$—* | 1~30 | *—Si(CH$_3$)$_2$—(CH$_2$)$_4$—* | CH$_3$—* |
| (s1-I-31) | *—CH$_2$—* | CH$_3$—* | 1~30 | — | CH$_3$—* |
| (s1-I-32) | *—CH$_2$—* | CH$_3$—* | 1~30 | *—Si(CH$_3$)$_2$—CH$_2$—* | CH$_3$—* |
| (s1-I-33) | *—CH$_2$—* | CH$_3$—* | 1~30 | *—Si(CH$_3$)$_2$—(CH$_2$)$_2$—* | CH$_3$—* |
| (s1-I-34) | *—CH$_2$—* | CH$_3$—* | 1~30 | *—Si(CH$_3$)$_2$—(CH$_2$)$_3$—* | CH$_3$—* |
| (s1-I-35) | *—CH$_2$—* | CH$_3$—* | 1~30 | *—Si(CH$_3$)$_2$—(CH$_2$)$_4$—* | CH$_3$—* |
| (s1-I-36) | *—(CH$_2$)$_2$—* | CH$_3$—* | 1~30 | — | CH$_3$—* |
| (s1-I-37) | *—(CH$_2$)$_2$—* | CH$_3$—* | 1~30 | *—Si(CH$_3$)$_2$—CH$_2$—* | CH$_3$—* |
| (s1-I-38) | *—(CH$_2$)$_2$—* | CH$_3$—* | 1~30 | *—Si(CH$_3$)$_2$—(CH$_2$)$_2$—* | CH$_3$—* |
| (s1-I-39) | *—(CH$_2$)$_2$—* | CH$_3$—* | 1~30 | *—Si(CH$_3$)$_2$—(CH$_2$)$_3$—* | CH$_3$—* |
| (s1-I-40) | *—(CH$_2$)$_2$—* | CH$_3$—* | 1~30 | *—Si(CH$_3$)$_2$—(CH$_2$)$_4$—* | CH$_3$—* |
| (s1-I-41) | *—(CH$_2$)$_3$—* | CH$_3$—* | 1~30 | — | CH$_3$—* |
| (s1-I-42) | *—(CH$_2$)$_3$—* | CH$_3$—* | 1~30 | *—Si(CH$_3$)$_2$—CH$_2$—* | CH$_3$—* |
| (s1-I-43) | *—(CH$_2$)$_3$—* | CH$_3$—* | 1~30 | *—Si(CH$_3$)$_2$—(CH$_2$)$_2$—* | CH$_3$—* |
| (s1-I-44) | *—(CH$_2$)$_3$—* | CH$_3$—* | 1~30 | *—Si(CH$_3$)$_2$—(CH$_2$)$_3$—* | CH$_3$—* |
| (s1-I-45) | *—(CH$_2$)$_3$—* | CH$_3$—* | 1~30 | *—Si(CH$_3$)$_2$—(CH$_2$)$_4$—* | CH$_3$—* |
| (s1-I-46) | *—(CH$_2$)$_4$—* | CH$_3$—* | 1~30 | — | CH$_3$—* |
| (s1-I-47) | *—(CH$_2$)$_4$—* | CH$_3$—* | 1~30 | *—Si(CH$_3$)$_2$—CH$_2$—* | CH$_3$—* |
| (s1-I-48) | *—(CH$_2$)$_4$—* | CH$_3$—* | 1~30 | *—Si(CH$_3$)$_2$—(CH$_2$)$_2$—* | CH$_3$—* |
| (s1-I-49) | *—(CH$_2$)$_4$—* | CH$_3$—* | 1~30 | *—Si(CH$_3$)$_2$—(CH$_2$)$_3$—* | CH$_3$—* |
| (s1-I-50) | *—(CH$_2$)$_4$—* | CH$_3$—* | 1~30 | *—Si(CH$_3$)$_2$—(CH$_2$)$_4$—* | CH$_3$—* |

The trialkylsilyl containing molecular chain should be bonded to a silicon atom (center silicon atom) contained in the film. The number of the trialkylsilyl containing molecular chain bonded to one center silicon atom is preferably 1 to 3, more preferably 1 or 2, especially preferably 1.

In the film of the present invention, the trialkylsilyl containing molecular chain is contained as a part of a structure represented by the formula (IA) (hereinafter, sometimes referred to as a "structure (A)").

[Formula 13]

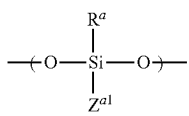

(IA)

wherein $R^a$ represents a trialkylsilyl containing molecular chain, and $Z^{a1}$ represents a trialkylsilyl containing molecular chain, siloxane containing group, hydrocarbon chain-containing group or —O— group.

The siloxane containing group should be a group that contains a siloxane unit (Si—O—), and is formed by atoms in a number smaller than the number of atoms forming the trialkylsilyl containing molecular chain. The siloxane containing group is thus a group that has a shorter length or a smaller three-dimensional size (bulkiness) as compared to the trialkylsilyl containing molecular chain. The siloxane containing group may contain a divalent hydrocarbon group.

The siloxane containing group is preferably a group represented by the following formula (s2).

[Formula 14]

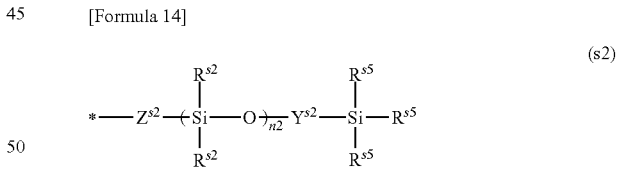

(s2)

wherein $R^{s2}$ represents the same meaning as above; $R^{s5}$ represents a hydrocarbon group or hydroxy group and —CH$_2$-contained in the hydrocarbon group may be replaced by —O—, and hydrogen atoms contained in the hydrocarbon group may be replaced by fluorine atoms; $Z^{s2}$ represents —O— or a divalent hydrocarbon group and —CH$_2$— contained in the divalent hydrocarbon group may be replaced by —O—; $Y^{s2}$ represents a single bond or —Si($R^{s2}$)$_2$-$L^{s2}$-; $L^{s2}$ represents a divalent hydrocarbon group and —CH$_2$— contained in the divalent hydrocarbon group may be replaced by —O—; n2 represents an integer of 0 to 5; and * represents a bond with a silicon atom.

Examples of the hydrocarbon group represented by $R^{s5}$ include groups similar to the hydrocarbon group represented by $R^{s1}$, and an aliphatic hydrocarbon group is preferred, with an alkyl group being more preferred. The carbon number is preferably 1 to 4, more preferably 1 to 3, further preferably 1 or 2.

Examples of the divalent hydrocarbon group represented by $Z^{s2}$ or $L^{s2}$ include groups similar to the divalent hydrocarbon group represented by $Z^{s1}$. The carbon number is preferably 1 to 10, more preferably 1 to 6, further preferably 1 to 4. The divalent hydrocarbon group represented by $Z^{s2}$ or $L^{s2}$ is preferably a divalent aliphatic hydrocarbon group, more preferably a linear or branched alkanediyl group.

n2 is preferably 1 to 5, more preferably 1 to 3.

The total number of atoms in the siloxane containing group is preferably not more than 100, more preferably not more than 50, further preferably not more than 30, and preferably not less than 10. The difference in the number of atoms between the trialkylsilyl containing molecular chain and the siloxane containing group is preferably not less than 10, more preferably not less than 20, and preferably not more than 1000, more preferably not more than 500, further preferably not more than 200.

Specific examples of the siloxane containing group include groups represented by the following formulae.

[Formula 15]

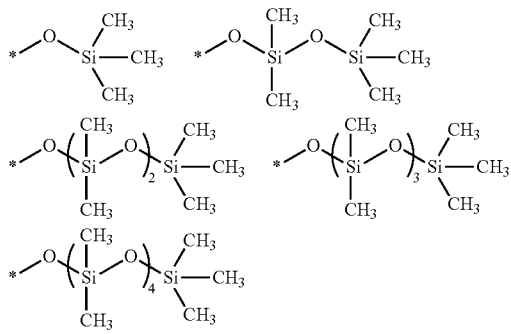

The hydrocarbon chain-containing group should have a hydrocarbon chain moiety with a carbon number that is smaller than the number of atoms forming the molecular chain in the trialkylsilyl containing molecular chain. The carbon number of the longest linear chain in the hydrocarbon chain is preferably smaller than the number of atoms forming the longest linear chain in the trialkylsilyl containing molecular chain.

The hydrocarbon chain-containing group may be composed only of a hydrocarbon group (hydrocarbon chain) or may be a group in which —$CH_2$— contained in the hydrocarbon chain are replaced by —O—, and is preferably composed only of a hydrocarbon group (hydrocarbon chain). It is to be noted that —$CH_2$— adjacent to a Si atom is not replaced by —O—, and two continuous —$CH_2$— are not simultaneously replaced by —O—.

The carbon number of the hydrocarbon chain moiety means the number of carbon atoms that form the hydrocarbon group (hydrocarbon chain) in the case of an oxygen-unsubstituted hydrocarbon chain-containing group, while the carbon number of the hydrocarbon chain moiety means the number of carbon atoms, which is counted with the assumption that —O— is considered as —$CH_2$—, in the case of an oxygen-substituted hydrocarbon chain-containing group. Hereinafter, the hydrocarbon chain-containing group is described and an oxygen-unsubstituted hydrocarbon chain-containing group (i.e., monovalent hydrocarbon group) is taken as an example unless otherwise specified, and a part of —$CH_2$— can be replaced by —O— in the following.

The carbon number of the hydrocarbon chain-containing group is preferably 1 to 3, more preferably 1. The hydrocarbon chain-containing group (in the case of a hydrocarbon group) may be a branched chain or a linear chain. The hydrocarbon chain-containing group (in the case of a hydrocarbon group) is preferably a saturated or unsaturated aliphatic hydrocarbon chain-containing group, more preferably a saturated aliphatic hydrocarbon chain-containing group. The saturated aliphatic hydrocarbon chain-containing group is preferably an alkyl group such as methyl group, ethyl group or propyl group.

When —$CH_2$— contained in the hydrocarbon chain is replaced by —O—, examples may include groups having ethylene glycol units.

$Z^{a1}$ is preferably a trialkylsilyl containing molecular chain or —O— group, more preferably a —O— group.

The structure (A) is preferably a structure represented by the following formula (IA-1), more preferably a structure represented by the formula (IA-1-1).

[Formula 16]

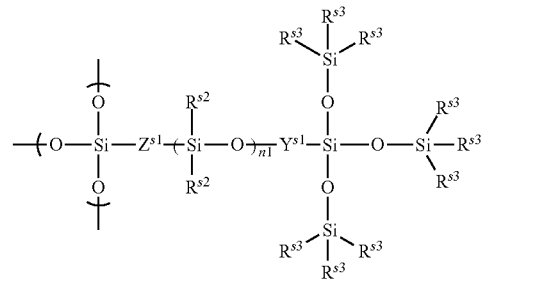

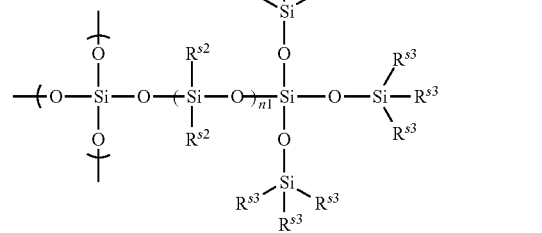

wherein $Z^{s1}$, $Y^{s1}$, $R^{s2}$, $R^{s3}$ and n1 respectively represent the same meaning as above.

The structure (A) may be a structure represented by the formula (IA-2), and may be preferably a structure represented by the formula (IA-2-1).

[Formula 17]

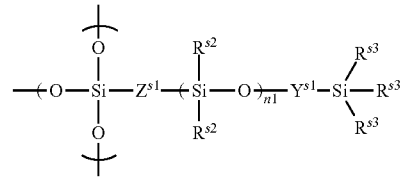

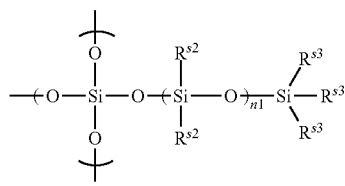

(IA-2-1)

wherein $Z^{s1}$, $Y^{s1}$, $R^{s2}$, $R^{s3}$ and n1 respectively represent the same meaning as above.

Examples of the structure (A) include structures represented by the formula (IA-I).

[Formula 18]

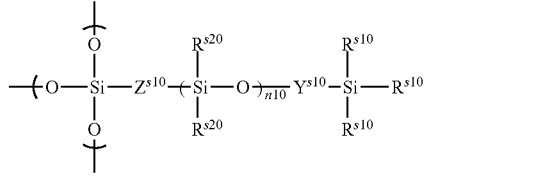

(IA-I)

TABLE 3

| | $Z^{s10}$ | $R^{s20}$ | n10 | $Y^{s10}$ | $R^{s10}$ |
|---|---|---|---|---|---|
| (IA-I-1) | *—O—* | $CH_3$—* | 1~30 | — | $(CH_3)_3SiO$—* |
| (IA-I-2) | *—O—* | $CH_3$—* | 1~30 | *—$Si(CH_3)_2$—$CH_2$—* | $(CH_3)_3SiO$—* |
| (IA-I-3) | *—O—* | $CH_3$—* | 1~30 | *—$Si(CH_3)_2$—$(CH_2)_2$—* | $(CH_3)_3SiO$—* |
| (IA-I-4) | *—O—* | $CH_3$—* | 1~30 | *—$Si(CH_3)_2$—$(CH_2)_3$—* | $(CH_3)_3SiO$—* |
| (IA-I-5) | *—O—* | $CH_3$—* | 1~30 | *—$Si(CH_3)_2$—$(CH_2)_4$—* | $(CH_3)_3SiO$—* |
| (IA-I-6) | *—$CH_2$—* | $CH_3$—* | 1~30 | — | $(CH_3)_3SiO$—* |
| (IA-I-7) | *—$CH_2$—* | $CH_3$—* | 1~30 | *—$Si(CH_3)_2$—$CH_2$—* | $(CH_3)_3SiO$—* |
| (IA-I-8) | *—$CH_2$—* | $CH_3$—* | 1~30 | *—$Si(CH_3)_2$—$(CH_2)_2$—* | $(CH_3)_3SiO$—* |
| (IA-I-9) | *—$CH_2$—* | $CH_3$—* | 1~30 | *—$Si(CH_3)_2$—$(CH_2)_3$—* | $(CH_3)_3SiO$—* |
| (IA-I-10) | *—$CH_2$—* | $CH_3$—* | 1~30 | *—$Si(CH_3)_2$—$(CH_2)_4$—* | $(CH_3)_3SiO$—* |
| (IA-I-11) | *—$(CH_2)_2$—* | $CH_3$—* | 1~30 | — | $(CH_3)_3SiO$—* |
| (IA-I-12) | *—$(CH_2)_2$—* | $CH_3$—* | 1~30 | *—$Si(CH_3)_2$—$CH_2$—* | $(CH_3)_3SiO$—* |
| (IA-I-13) | *—$(CH_2)_2$—* | $CH_3$—* | 1~30 | *—$Si(CH_3)_2$—$(CH_2)_2$—* | $(CH_3)_3SiO$—* |
| (IA-I-14) | *—$(CH_2)_2$—* | $CH_3$—* | 1~30 | *—$Si(CH_3)_2$—$(CH_2)_3$—* | $(CH_3)_3SiO$—* |
| (IA-I-15) | *—$(CH_2)_2$—* | $CH_3$—* | 1~30 | *—$Si(CH_3)_2$—$(CH_2)_4$—* | $(CH_3)_3SiO$—* |
| (IA-I-16) | *—$(CH_2)_3$—* | $CH_3$—* | 1~30 | — | $(CH_3)_3SiO$—* |
| (IA-I-17) | *—$(CH_2)_3$—* | $CH_3$—* | 1~30 | *—$Si(CH_3)_2$—$CH_2$—* | $(CH_3)_3SiO$—* |
| (IA-I-18) | *—$(CH_2)_3$—* | $CH_3$—* | 1~30 | *—$Si(CH_3)_2$—$(CH_2)_2$—* | $(CH_3)_3SiO$—* |
| (IA-I-19) | *—$(CH_2)_3$—* | $CH_3$—* | 1~30 | *—$Si(CH_3)_2$—$(CH_2)_3$—* | $(CH_3)_3SiO$—* |
| (IA-I-20) | *—$(CH_2)_3$—* | $CH_3$—* | 1~30 | *—$Si(CH_3)_2$—$(CH_2)_4$—* | $(CH_3)_3SiO$—* |
| (IA-I-21) | *—$(CH_2)_4$—* | $CH_3$—* | 1~30 | — | $(CH_3)_3SiO$—* |
| (IA-I-22) | *—$(CH_2)_4$—* | $CH_3$—* | 1~30 | *—$Si(CH_3)_2$—$CH_2$—* | $(CH_3)_3SiO$—* |
| (IA-I-23) | *—$(CH_2)_4$—* | $CH_3$—* | 1~30 | *—$Si(CH_3)_2$—$(CH_2)_2$—* | $(CH_3)_3SiO$—* |
| (IA-I-24) | *—$(CH_2)_4$—* | $CH_3$—* | 1~30 | *—$Si(CH_3)_2$—$(CH_2)_3$—* | $(CH_3)_3SiO$—* |
| (IA-I-25) | *—$(CH_2)_4$—* | $CH_3$—* | 1~30 | *—$Si(CH_3)_2$—$(CH_2)_4$—* | $(CH_3)_3SiO$—* |

TABLE 4

| | $Z^{s10}$ | $R^{s20}$ | n10 | $Y^{s10}$ | $R^{s10}$ |
|---|---|---|---|---|---|
| (IA-I-26) | *—O—* | $CH_3$—* | 1~30 | — | $CH_3$—* |
| (IA-I-27) | *—O—* | $CH_3$—* | 1~30 | *—$Si(CH_3)_2$—$CH_2$—* | $CH_3$—* |
| (IA-I-28) | *—O—* | $CH_3$—* | 1~30 | *—$Si(CH_3)_2$—$(CH_2)_2$—* | $CH_3$—* |
| (IA-I-29) | *—O—* | $CH_3$—* | 1~30 | *—$Si(CH_3)_2$—$(CH_2)_3$—* | $CH_3$—* |
| (IA-I-30) | *—O—* | $CH_3$—* | 1~30 | *—$Si(CH_3)_2$—$(CH_2)_4$—* | $CH_3$—* |
| (IA-I-31) | *—$CH_2$—* | $CH_3$—* | 1~30 | — | $CH_3$—* |
| (IA-I-32) | *—$CH_2$—* | $CH_3$—* | 1~30 | *—$Si(CH_3)_2$—$CH_2$—* | $CH_3$—* |
| (IA-I-33) | *—$CH_2$—* | $CH_3$—* | 1~30 | *—$Si(CH_3)_2$—$(CH_2)_2$—* | $CH_3$—* |
| (IA-I-34) | *—$CH_2$—* | $CH_3$—* | 1~30 | *—$Si(CH_3)_2$—$(CH_2)_3$—* | $CH_3$—* |
| (IA-I-35) | *—$CH_2$—* | $CH_3$—* | 1~30 | *—$Si(CH_3)_2$—$(CH_2)_4$—* | $CH_3$—* |
| (IA-I-36) | *—$(CH_2)_2$—* | $CH_3$—* | 1~30 | — | $CH_3$—* |
| (IA-I-37) | *—$(CH_2)_2$—* | $CH_3$—* | 1~30 | *—$Si(CH_3)_2$—$CH_2$—* | $CH_3$—* |
| (IA-I-38) | *—$(CH_2)_2$—* | $CH_3$—* | 1~30 | *—$Si(CH_3)_2$—$(CH_2)_2$—* | $CH_3$—* |
| (IA-I-39) | *—$(CH_2)_2$—* | $CH_3$—* | 1~30 | *—$Si(CH_3)_2$—$(CH_2)_3$—* | $CH_3$—* |
| (IA-I-40) | *—$(CH_2)_2$—* | $CH_3$—* | 1~30 | *—$Si(CH_3)_2$—$(CH_2)_4$—* | $CH_3$—* |
| (IA-I-41) | *—$(CH_2)_3$—* | $CH_3$—* | 1~30 | — | $CH_3$—* |
| (IA-I-42) | *—$(CH_2)_3$—* | $CH_3$—* | 1~30 | *—$Si(CH_3)_2$—$CH_2$—* | $CH_3$—* |
| (IA-I-43) | *—$(CH_2)_3$—* | $CH_3$—* | 1~30 | *—$Si(CH_3)_2$—$(CH_2)_2$—* | $CH_3$—* |
| (IA-I-44) | *—$(CH_2)_3$—* | $CH_3$—* | 1~30 | *—$Si(CH_3)_2$—$(CH_2)_3$—* | $CH_3$—* |
| (IA-I-45) | *—$(CH_2)_3$—* | $CH_3$—* | 1~30 | *—$Si(CH_3)_2$—$(CH_2)_4$—* | $CH_3$—* |
| (IA-I-46) | *—$(CH_2)_4$—* | $CH_3$—* | 1~30 | — | $CH_3$—* |
| (IA-I-47) | *—$(CH_2)_4$—* | $CH_3$—* | 1~30 | *—$Si(CH_3)_2$—$CH_2$—* | $CH_3$—* |
| (IA-I-48) | *—$(CH_2)_4$—* | $CH_3$—* | 1~30 | *—$Si(CH_3)_2$—$(CH_2)_2$—* | $CH_3$—* |
| (IA-I-49) | *—$(CH_2)_4$—* | $CH_3$—* | 1~30 | *—$Si(CH_3)_2$—$(CH_2)_3$—* | $CH_3$—* |
| (IA-I-50) | *—$(CH_2)_4$—* | $CH_3$—* | 1~30 | *—$Si(CH_3)_2$—$(CH_2)_4$—* | $CH_3$—* |

Preferably, the film of the present invention further comprises a structure (B) that includes a metal atom and a group bonded to the metal atom, wherein the metal atom is selected from trivalent and tetravalent metal atoms that is capable of forming a metal alkoxide, and the number of atoms in the group is smaller than the number of atoms forming the trialkylsilyl containing molecular chain. Particularly, when the group formed by atoms in a number smaller than the number of atoms forming the trialkylsilyl containing molecular chain is bonded to a silicon atom (second silicon atom) or a metal atom that is different from the silicon atom to which the trialkylsilyl containing molecular chain is bonded, the silicon atom (second silicon atom) or the metal atom to which the group described above is bonded also acts as a spacer, and thus the water repellency of the film is easily improved.

The structure (B) is preferably a structure represented by the formula (IIB).

[Formula 19]

(IIB)

wherein M represents the trivalent or tetravalent metal atom capable of forming the metal alkoxide;
$R^{b2}$ represents a siloxane containing group, hydrocarbon chain-containing group, hydroxy group or —O— group; and k represents an integer of 1 or 2 depending on the valence of M.

M is a metal atom capable of forming a metal alkoxide with a bond to an alkoxy group, and the metal atom also includes semimetals such as Si and Ge. Examples of the metal M include trivalent metals such as Al, Fe and In; and tetravalent metals such as Hf, Si, Ti, Sn and Zr, and trivalent metals such as Al and tetravalent metals such as Si, Ti, Sn and Zr are preferred, and Al, Si, Ti and Zr are further preferred, with Si being especially preferred. The alkoxide of such a metal is easily liquefied, so that the uniformity of the distribution of the structure (B) in the film of the present invention is easily improved.

k represents 1 when M is a trivalent metal, and k represents 2 when M is a tetravalent metal.

The number of atoms in the siloxane containing group and hydrocarbon chain-containing group represented by $R^{b2}$ is preferably smaller than the number of atoms in the trialkylsilyl containing molecular chain. The structure (B) thus easily acts as a spacer in the film.

Examples of the siloxane containing group and hydrocarbon chain-containing group represented by $R^{b2}$ include groups similar to the siloxane containing group and hydrocarbon chain-containing group, respectively, represented by $Z^{a1}$.

$R^{b2}$ is preferably a siloxane containing group, hydroxy group or —O— group, more preferably a hydroxy group or —O— group.

Examples of the structure (B) include structures represented by the following formulae when M is a silicon atom.

[Formula 20]

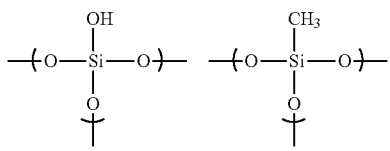

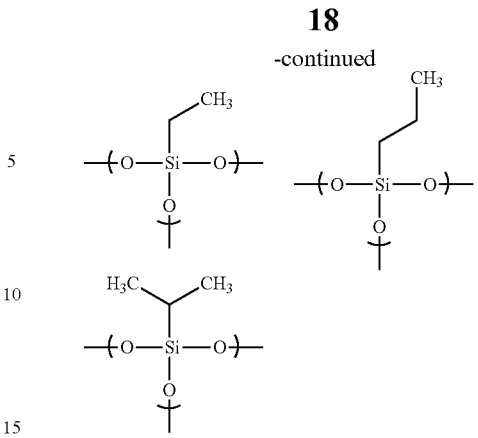

In the film of the present invention, the abundance ratio of the structure (B) to the structure (A) (structure (B)/structure (A)) is preferably not less than 1/50, more preferably not less than 1/1, further preferably not less than 2/1, and preferably not more than 100/1, more preferably not more than 75/1, still more preferably not more than 50/1, further preferably not more than 30/1, in terms of moles.

For forming the film of the present invention, the following procedure should be carried out: an organosilicon compound (a) and a metal compound (b) are mixed, next the mixture is diluted with a solvent (c) as necessary to prepare a composition containing the organosilicon compound (a), the metal compound (b) and the optional solvent (c), and the composition is brought into contact with a substrate in air. Methoxy groups or hydrolyzable groups contained in the organosilicon compound (a) and the metal compound (b) are thus subjected to hydrolysis and polycondensation to form a siloxane backbone with a trialkylsilyl containing molecular chain bonded to silicon atoms on the backbone.

The composition contains the components described above, and is therefore conveniently usable without the need of wiping out an excess, unlike heretofore known water-repellent agents.

The organosilicon compound (a) has at least one trialkylsilyl containing molecular chain bonded to a center silicon atom and at least one methoxy group bonded to the center silicon atom in one molecule. The at least one methoxy group bonded to a center silicon atom accelerates the co-hydrolysis and co-condensation of the organosilicon compound (a) and the metal compound (b). It is considered that the abundance ratio of carbon atoms in the film surface is relatively increased from the difference in compatibility between the polydimethylsiloxane chain of the organosilicon compound (a) and the co-hydrolysis and co-condensation moiety of the organosilicon compound (a) and the metal compound (b), so that the ratio of carbon atoms to silicon atoms (C/Si) in the resulting film is easily increased. Examples of the organosilicon compound (a) may include a compound in which one trialkylsilyl containing molecular chain and three methoxy groups are bonded to a center silicon atom; a compound in which one trialkylsilyl containing molecular chain, one siloxane containing group and two methoxy groups are bonded to a center silicon atom; and a compound in which one trialkylsilyl containing molecular chain, one hydrocarbon chain-containing group and two methoxy groups are bonded to a center silicon atom.

Specifically, the organosilicon compound (a) is preferably a compound represented by the following formula (I).

[Formula 21]

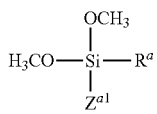
(I)

wherein $R^a$ represents a trialkylsilyl containing molecular chain, and $Z^{a1}$ represents a trialkylsilyl containing molecular chain, hydrocarbon chain-containing group, siloxane containing group or methoxy group.

In the organosilicon compound (a), the number of the methoxy groups bonded to the center silicon atom is preferably 2 or 3.

The organosilicon compound (a) is preferably a compound represented by the following formula (I-1), more preferably a compound represented by the formula (I-1-1).

[Formula 22]

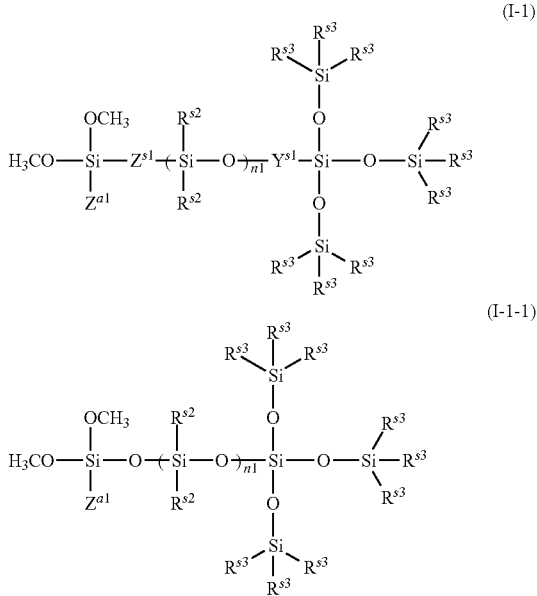

wherein $Z^{a1}$, $Z^{s1}$, $Y^{s1}$, $R^{s2}$, $R^{s3}$ and n1 respectively represent the same meaning as above.

The organosilicon compound (a) may be a compound represented by the formula (I-2), and may be preferably a compound represented by the formula (I-2-1).

[Formula 23]

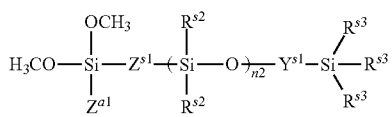
(I-2)

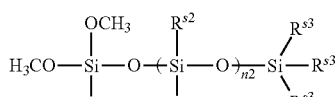
(I-2-1)

wherein $Z^{a1}$, $Z^{s1}$, $Y^{s1}$, $R^{s2}$, $R^{s3}$ and n2 respectively represent the same meaning as above.

Specific examples of the organosilicon compound (a) include groups represented by the formula (I-I).

[Formula 24]

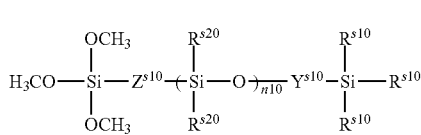
(I-I)

TABLE 5

| | $Z^{s10}$ | $R^{s20}$ | n10 | $Y^{s10}$ | $R^{s10}$ |
|---|---|---|---|---|---|
| (I-I-1) | *—O—* | $CH_3$—* | 1~30 | — | $(CH_3)_3SiO$—* |
| (I-I-2) | *—O—* | $CH_3$—* | 1~30 | *—$Si(CH_3)_2$—$CH_2$—* | $(CH_3)_3SiO$—* |
| (I-I-3) | *—O—* | $CH_3$—* | 1~30 | *—$Si(CH_3)_2$—$(CH_2)_2$—* | $(CH_3)_3SiO$—* |
| (I-I-4) | *—O—* | $CH_3$—* | 1~30 | *—$Si(CH_3)_2$—$(CH_2)_3$—* | $(CH_3)_3SiO$—* |
| (I-I-5) | *—O—* | $CH_3$—* | 1~30 | *—$Si(CH_3)_2$—$(CH_2)_4$—* | $(CH_3)_3SiO$—* |
| (I-I-6) | *—$CH_2$—* | $CH_3$—* | 1~30 | — | $(CH_3)_3SiO$—* |
| (I-I-7) | *—$CH_2$—* | $CH_3$—* | 1~30 | *—$Si(CH_3)_2$—$CH_2$—* | $(CH_3)_3SiO$—* |
| (I-I-8) | *—$CH_2$—* | $CH_3$—* | 1~30 | *—$Si(CH_3)_2$—$(CH_2)_2$—* | $(CH_3)_3SiO$—* |
| (I-I-9) | *—$CH_2$—* | $CH_3$—* | 1~30 | *—$Si(CH_3)_2$—$(CH_2)_3$—* | $(CH_3)_3SiO$—* |
| (I-I-10) | *—$CH_2$—* | $CH_3$—* | 1~30 | *—$Si(CH_3)_2$—$(CH_2)_4$—* | $(CH_3)_3SiO$—* |
| (I-I-11) | *—$(CH_2)_2$—* | $CH_3$—* | 1~30 | — | $(CH_3)_3SiO$—* |
| (I-I-12) | *—$(CH_2)_2$—* | $CH_3$—* | 1~30 | *—$Si(CH_3)_2$—$CH_2$—* | $(CH_3)_3SiO$—* |
| (I-I-13) | *—$(CH_2)_2$—* | $CH_3$—* | 1~30 | *—$Si(CH_3)_2$—$(CH_2)_2$—* | $(CH_3)_3SiO$—* |
| (I-I-14) | *—$(CH_2)_2$—* | $CH_3$—* | 1~30 | *—$Si(CH_3)_2$—$(CH_2)_3$—* | $(CH_3)_3SiO$—* |
| (I-I-15) | *—$(CH_2)_2$—* | $CH_3$—* | 1~30 | *—$Si(CH_3)_2$—$(CH_2)_4$—* | $(CH_3)_3SiO$—* |
| (I-I-16) | *—$(CH_2)_3$—* | $CH_3$—* | 1~30 | — | $(CH_3)_3SiO$—* |
| (I-I-17) | *—$(CH_2)_3$—* | $CH_3$—* | 1~30 | *—$Si(CH_3)_2$—$CH_2$—* | $(CH_3)_3SiO$—* |
| (I-I-18) | *—$(CH_2)_3$—* | $CH_3$—* | 1~30 | *—$Si(CH_3)_2$—$(CH_2)_2$—* | $(CH_3)_3SiO$—* |
| (I-I-19) | *—$(CH_2)_3$—* | $CH_3$—* | 1~30 | *—$Si(CH_3)_2$—$(CH_2)_3$—* | $(CH_3)_3SiO$—* |
| (I-I-20) | *—$(CH_2)_3$—* | $CH_3$—* | 1~30 | *—$Si(CH_3)_2$—$(CH_2)_4$—* | $(CH_3)_3SiO$—* |
| (I-I-21) | *—$(CH_2)_4$—* | $CH_3$—* | 1~30 | — | $(CH_3)_3SiO$—* |
| (I-I-22) | *—$(CH_2)_4$—* | $CH_3$—* | 1~30 | *—$Si(CH_3)_2$—$CH_2$—* | $(CH_3)_3SiO$—* |
| (I-I-23) | *—$(CH_2)_4$—* | $CH_3$—* | 1~30 | *—$Si(CH_3)_2$—$(CH_2)_2$—* | $(CH_3)_3SiO$—* |

TABLE 5-continued

| | $Z^{s10}$ | $R^{s20}$ | n10 | $Y^{s10}$ | $R^{s10}$ |
|---|---|---|---|---|---|
| (I-I-24) | *—(CH$_2$)$_4$—* | CH$_3$—* | 1~30 | *—Si(CH$_3$)$_2$—(CH$_2$)$_3$—* | (CH$_3$)$_3$SiO—* |
| (I-I-25) | *—(CH$_2$)$_4$—* | CH$_3$—* | 1~30 | *—Si(CH$_3$)$_2$—(CH$_2$)$_4$—* | (CH$_3$)$_3$SiO—* |

TABLE 6

| | $Z^{s10}$ | $R^{s20}$ | n10 | $Y^{s10}$ | $R^{s10}$ |
|---|---|---|---|---|---|
| (I-I-26) | *—O—* | CH$_3$—* | 1~30 | — | CH$_3$—* |
| (I-I-27) | *—O—* | CH$_3$—* | 1~30 | *—Si(CH$_3$)$_2$—CH$_2$—* | CH$_3$—* |
| (I-I-28) | *—O—* | CH$_3$—* | 1~30 | *—Si(CH$_3$)$_2$—(CH$_2$)$_2$—* | CH$_3$—* |
| (I-I-29) | *—O—* | CH$_3$—* | 1~30 | *—Si(CH$_3$)$_2$—(CH$_2$)$_3$—* | CH$_3$—* |
| (I-I-30) | *—O—* | CH$_3$—* | 1~30 | *—Si(CH$_3$)$_2$—(CH$_2$)$_4$—* | CH$_3$—* |
| (I-I-31) | *—CH$_2$—* | CH$_3$—* | 1~30 | — | CH$_3$—* |
| (I-I-32) | *—CH$_2$—* | CH$_3$—* | 1~30 | *—Si(CH$_3$)$_2$—CH$_2$—* | CH$_3$—* |
| (I-I-33) | *—CH$_2$—* | CH$_3$—* | 1~30 | *—Si(CH$_3$)$_2$—(CH$_2$)$_2$—* | CH$_3$—* |
| (I-I-34) | *—CH$_2$—* | CH$_3$—* | 1~30 | *—Si(CH$_3$)$_2$—(CH$_2$)$_3$—* | CH$_3$—* |
| (I-I-35) | *—CH$_2$—* | CH$_3$—* | 1~30 | *—Si(CH$_3$)$_2$—(CH$_2$)$_4$—* | CH$_3$—* |
| (I-I-36) | *—(CH$_2$)$_2$—* | CH$_3$—* | 1~30 | — | CH$_3$—* |
| (I-I-37) | *—(CH$_2$)$_2$—* | CH$_3$—* | 1~30 | *—Si(CH$_3$)$_2$—CH$_2$—* | CH$_3$—* |
| (I-I-38) | *—(CH$_2$)$_2$—* | CH$_3$—* | 1~30 | *—Si(CH$_3$)$_2$—(CH$_2$)$_2$—* | CH$_3$—* |
| (I-I-39) | *—(CH$_2$)$_2$—* | CH$_3$—* | 1~30 | *—Si(CH$_3$)$_2$—(CH$_2$)$_3$—* | CH$_3$—* |
| (I-I-40) | *—(CH$_2$)$_2$—* | CH$_3$—* | 1~30 | *—Si(CH$_3$)$_2$—(CH$_2$)$_4$—* | CH$_3$—* |
| (I-I-41) | *—(CH$_2$)$_3$—* | CH$_3$—* | 1~30 | — | CH$_3$—* |
| (I-I-42) | *—(CH$_2$)$_3$—* | CH$_3$—* | 1~30 | *—Si(CH$_3$)$_2$—CH$_2$—* | CH$_3$—* |
| (I-I-43) | *—(CH$_2$)$_3$—* | CH$_3$—* | 1~30 | *—Si(CH$_3$)$_2$—(CH$_2$)$_2$—* | CH$_3$—* |
| (I-I-44) | *—(CH$_2$)$_3$—* | CH$_3$—* | 1~30 | *—Si(CH$_3$)$_2$—(CH$_2$)$_3$—* | CH$_3$—* |
| (I-I-45) | *—(CH$_2$)$_3$—* | CH$_3$—* | 1~30 | *—Si(CH$_3$)$_2$—(CH$_2$)$_4$—* | CH$_3$—* |
| (I-I-46) | *—(CH$_2$)$_4$—* | CH$_3$—* | 1~30 | — | CH$_3$—* |
| (I-I-47) | *—(CH$_2$)$_4$—* | CH$_3$—* | 1~30 | *—Si(CH$_3$)$_2$—CH$_2$—* | CH$_3$—* |
| (I-I-48) | *—(CH$_2$)$_4$—* | CH$_3$—* | 1~30 | *—Si(CH$_3$)$_2$—(CH$_2$)$_2$—* | CH$_3$—* |
| (I-I-49) | *—(CH$_2$)$_4$—* | CH$_3$—* | 1~30 | *—Si(CH$_3$)$_2$—(CH$_2$)$_3$—* | CH$_3$—* |
| (I-I-50) | *—(CH$_2$)$_4$—* | CH$_3$—* | 1~30 | *—Si(CH$_3$)$_2$—(CH$_2$)$_4$—* | CH$_3$—* |

Examples of the method for synthesizing the organosilicon compound (a) include the following methods. As a first method, the organosilicon compound (a) can be produced by the reaction of a compound in which a trialkylsilyl containing molecular chain and a halogen atom (preferably a chlorine atom) are bonded to each other, with a compound in which three or more (particularly four) methoxy groups are bonded to a silicon atom.

As a second synthesis method, the organosilicon compound (a) can be produced by the reaction of a compound in which a halogen atom is bonded to both ends of a dialkylsiloxane chain (hereinafter, referred to as a "dihalogenated dialkylsiloxane"), a compound in which tris(trialkylsilyloxy)silyl group and an M$^1$O— group (M$^1$ represents an alkali metal) are bonded to each other (hereinafter, referred to as an "alkali metal silyl oxide"), and a compound in which at least three methoxy groups and one alkoxy group are bonded to a silicon atom. The reaction order of these compounds is not limited, and it is preferred to first react the dihalogenated dialkylsiloxane and the alkali metal silyl oxide, and then to react with the compound in which at least three methoxy groups and one alkoxy group are bonded to a silicon atom.

Examples of the halogen atom include fluorine atom, chlorine atom, bromine atom and iodine atom, and chlorine atom is preferred. The alkali metal is preferably lithium.

The alkali metal silyl oxide can be produced by reacting an alkyl alkali metal with a compound in which tris(trialkylsilyloxy)silyl group and hydroxy group are bonded to each other for example. Examples of the organic alkali metal compound include alkyllithiums such as n-butyllithium, sec-butyllithium and tert-butyllithium, and n-butyllithium is especially preferred.

As a third synthesis method, the organosilicon compound (a) can be produced by reacting an alkali metal silyl oxide and a cyclic dimethylsiloxane, and then reacting the product with a compound in which three methoxy groups and one halogen atom (particularly chlorine atom) are bonded to a silicon atom for example.

As a fourth synthesis method, the organosilicon compound (a) can also be produced by reacting an alkali metal silyl oxide and a cyclic dimethylsiloxane, and then reacting the resulting hydroxyl group-terminated polydimethylsiloxane compound with a tetraalkoxysilane for example.

The content ratio of the organosilicon compound (a) is preferably not less than 1% by mass, more preferably not less than 5% by mass, further preferably not less than 7% by mass, and preferably not more than 50% by mass, more preferably not more than 30% by mass, further preferably not more than 20% by mass, in 100% by mass of a solid of the composition.

The solid of the composition means components except for the solvent (c) among the components contained in the composition.

The metal compound (b) is a compound in which at least one hydrolyzable group is bonded to the center metal atom. The siloxane containing group, the hydrocarbon chain-containing group, a carbon fluoride containing group, or a hydrolyzable silane oligomer residue, etc. may be bonded to the metal atom. Since the numbers of atoms forming these groups are each smaller than the number of atoms that form the trialkylsilyl containing molecular chain bonded to the center silicon atom in the organosilicon compound (a), a part having a spacer function can be formed in the film of the present invention. As a result, the water repellency brought about by the trialkylsilyl containing molecular chain can be increased.

Specifically, the metal compound (b) is preferably a compound represented by the formula (II) (hereinafter, sometimes referred to as a "compound (II)"). The compound represented by the formula (II) may be a hydrolysis condensation product thereof. Here, the hydrolysis condensation product means a compound formed by condensing all or a part of hydrolyzable groups contained in each compound by hydrolysis.

[Formula 25]

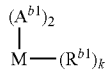

(II)

wherein M and k respectively represent the same meaning as above; $R^{b1}$ represents a siloxane containing group, hydrocarbon chain-containing group or hydrolyzable group; $A^{b1}$ represents a hydrolyzable group; and k represents an integer of 1 or 2 depending on the valence of M.

The hydrolyzable group represented by $R^{b1}$ or $A^{b1}$ should be a group that gives hydroxy group (silanol group when M is a silicon atom) through hydrolysis, and examples thereof include alkoxy groups with a carbon number of 1 to 4, such as methoxy group, ethoxy group, propoxy group and butoxy group; acetoxy group; chlorine atom; and isocyanato group. Alkoxy groups with a carbon number of 1 to 4 are preferred, and alkoxy groups with a carbon number of 1 or 2 are more preferred.

In the metal compound (b), the number of the hydrolyzable groups is preferably not less than 1, more preferably not less than 2, further preferably not less than 3, and preferably not more than 4.

The siloxane containing group or hydrocarbon chain-containing group represented by $R^{b1}$ can be appropriately selected from the groups described as the siloxane containing group and hydrocarbon chain-containing group, respectively, represented by $Z^{a1}$, and the number thereof is preferably not more than 1, especially preferably 0.

Here, the siloxane containing group may also comprise a trialkylsilyl group, and the structure derived from the metal compound (b) (structure (B)) may exhibit a function as a spacer in the obtained film since the number of atoms in the siloxane containing group is smaller than the number of atoms in the trialkylsilyl containing molecular chain.

$R^{b1}$ is preferably a siloxane containing group or hydrolyzable group, more preferably a hydrolyzable group. When a plurality of $R^{b1}$ are contained, all of them are preferably hydrolyzable groups. In this case, $R^{b1}$ and $A^{b1}$ are preferably the same hydrolyzable groups. The hydrolyzable groups of the organosilicon compound (a) and the metal compound (b) may be the same groups.

Examples of the compound (II) may include compounds having only one hydrolyzable group; compounds having one siloxane containing group and one hydrolyzable group; compounds having two siloxane containing groups and one hydrolyzable group; compounds having one hydrocarbon chain-containing group and a hydrolyzable group; and compounds having two hydrocarbon chain-containing groups and one hydrolyzable group.

Examples of the compound having only the hydrolyzable group include tetraalkoxysilanes such as tetramethoxysilane, tetraethoxysilane, tetrapropoxysilane and tetrabutoxysilane; trialkoxyaluminums such as triethoxyaluminum, tripropoxyaluminum and tributoxyaluminum; trialkoxyirons such as triethoxyiron; trialkoxyindiums such as trimethoxyindium, triethoxyindium, tripropoxyindium and tributoxyindium; tetraalkoxyhafniums such as tetramethoxyhafnium, tetraethoxyhafnium, tetrapropoxyhafnium and tetrabutoxyhafnium; tetraalkoxytitaniums such as tetramethoxytitanium, tetraethoxytitanium, tetrapropoxytitanium and tetrabutoxytitanium; tetraalkoxytins such as tetramethoxytin, tetraethoxytin, tetrapropoxytin and tetrabutoxytin; and tetraalkoxyzirconiums such as tetramethoxyzirconium, tetraethoxyzirconium, tetrapropoxyzirconium and tetrabutoxyzirconium.

Examples of the compound having a siloxane containing group and a hydrolyzable group include trimethylsilyloxy trialkoxysilanes such as trimethylsilyloxy trimethoxysilane, trimethylsilyloxy triethoxysilane and trimethylsilyloxy tripropoxysilane.

Examples of the compound having two siloxane containing groups and a hydrolyzable group include di(trimethylsilyloxy)dialkoxysilanes such as di(trimethylsilyloxy)dimethoxysilane, di(trimethylsilyloxy)diethoxysilane and di(trimethylsilyloxy)dipropoxysilane.

Examples of the compound having a hydrocarbon chain-containing group and a hydrolyzable group include alkyltrialkoxysilanes such as methyltrimethoxysilane, ethyltrimethoxysilane, methyltriethoxysilane, ethyltriethoxysilane and methyltripropoxysilane; and alkenyltrialkoxysilanes such as vinyltrimethoxysilane and vinyltriethoxysilane.

Examples of the compound having two hydrocarbon chain-containing groups and a hydrolyzable group include dialkyldialkoxysilanes such as dimethyldimethoxysilane, diethyldimethoxysilane, dimethyldiethoxysilane and diethyldiethoxysilane.

The content ratio of the metal compound (b) is preferably not less than 1% by mass, more preferably not less than 5% by mass, further preferably not less than 10% by mass, and preferably not more than 50% by mass, more preferably not more than 30% by mass, further preferably not more than 20% by mass, in 100% by mass of a solid of the composition.

In the composition, the ratio of the metal compound (b) to the organosilicon compound (a) (metal compound (b)/organosilicon compound (a)) is preferably not less than 1/10, more preferably not less than 1/1, further preferably not less than 2/1, and preferably not more than 100/1, more preferably not more than 50/1, still more preferably not more than 30/1, further preferably not more than 25/1, in terms of moles.

Preferably, the composition further contains a solvent (c). Examples of the solvent (c) include water; hydrophilic organic solvents such as alcohol-based solvents, ether-based solvents, ketone-based solvents, ester-based solvents and amide-based solvents; and hydrophobic organic solvents such as aromatic hydrocarbon-based solvents and saturated hydrocarbon-based solvents. These solvents may be used singly, or used in combination of two or more thereof.

Examples of the alcohol-based solvent include methanol, ethanol, propanol, isopropyl alcohol, butanol, ethylene glycol, propylene glycol and diethylene glycol; examples of the ether-based solvent include dimethoxy ethane, tetrahydrofuran and dioxane; examples of the ketone-based solvent include acetone and methyl ethyl ketone; examples of the ester-based solvent include ethyl acetate and butyl acetate; examples of the amide-based solvent include dimethylformamide; examples of the aromatic hydrocarbon-based solvent include benzene, toluene and xylene; and examples of the saturated hydrocarbon-based solvent include hexane and cyclohexane.

Alcohol-based solvents and ketone-based solvents are preferred, and these solvents may contain water.

When water is contained, the content ratio of water in the solvent (c) is preferably not less than 0.1% by mass, more preferably not less than 5% by mass, further preferably not less than 10% by mass, and preferably not more than 90% by mass, more preferably not more than 70% by mass, further preferably not more than 50% by mass.

The amount of the solvent (c) is preferably not less than 0.1 parts by mass, more preferably not less than 1 part by mass, further preferably not less than 3 parts by mass, and preferably not more than 100 parts by mass, more preferably not more than 80 parts by mass, further preferably not more than 50 parts by mass based on 1 part by mass of the total of the organosilicon compound (a) and the metal compound (b). When the amount of the solvent (c) is in the range as described above, the thickness of the film is easily controlled.

The composition may further contain a catalyst (d). The catalyst (d) should act as a hydrolysis catalyst for hydrolyzable groups that are bonded to a silicon atom, and examples of the catalyst (d) include acidic compounds; basic compounds; and organometallic compounds. Examples of the acidic compound include inorganic acids such as hydrochloric acid and nitric acid; and organic acids such as acetic acid. Examples of the basic compound include ammonia and amine. The organometallic compound comprises a metal atom such as Al, Fe, Zn or Sn as a center metal, and examples thereof include organoaluminum compounds such as aluminum-acetylacetone complexes and aluminum-ethyl acetoacetate complexes; organoiron compounds such as iron octylate; organozinc compounds such as zinc acetylacetonate monohydrate, zinc naphthenate and zinc octylate; and organotin compounds such as dibutyl tin diacetate complexes.

The catalyst (d) is preferably an organometallic compound or an acidic compound, more preferably an organoaluminum compound or hydrochloric acid.

The amount of the catalyst (d) is preferably not less than 0.0001 parts by mass, more preferably not less than 0.0002 parts by mass, further preferably not less than 0.001 parts by mass, and preferably not more than 20 parts by mass, more preferably not more than 10 parts by mass, further preferably not more than 5 parts by mass based on 100 parts by mass of the total of the organosilicon compound (a) and the metal compound (b).

Further, the composition may contain various kinds of additives such as an antioxidant, a rust inhibitor, an ultraviolet absorber, a light stabilizer, an antifungal agent, an antibacterial agent, an organism deposition preventing agent, a deodorizer, a pigment, a flame retardant and an antistatic agent without inhibiting the effect of the present invention.

Examples of the antioxidant include phenol-based antioxidants, sulfur-based antioxidants, phosphorus-based antioxidants and hindered amine-based antioxidants.

Examples of the phenol-based antioxidant include n-octadecyl-3-(4-hydroxy-3,5-di-t-butylphenyl)propionate, 2,6-di-t-butyl-4-methylphenol, 2,2-thio-diethylene-bis-[3-(3,5-di-t-butyl-4-hydroxyphenyl)propionate], tri-ethyleneglycol-bis-[3-(3-t-butyl-5-methyl-4-hydroxyphenyl)propionate], 3,9-bis[2-{3-(3-t-butyl-4-hydroxy-5-methylphenyl)propionyloxy}-1,1-dimethylethyl]-2,4,8,10-tetraoxaspiro[5.5]undecane, tetrakis{3-(3,5-di-t-butyl-4-hydroxyphenyl)-propionic acid}pentaerythrityl esters, 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 1,3,5-trimethyl-2,4,6-tris(3,5-di-t-butyl-4-hydroxybenzyl)benzene, tris(3,5-di-t-butyl-4-hydroxybenzyl) isocyanurate, 1,3,5-tris(4-t-butyl-3-hydroxy-2,6-dimethylbenzyl)-1,3,5-triazine-2,4,6-(1H,3H,5H)-trione, 2,2'-methylenebis(6-t-butyl-4-methylphenol), 4,4'-butylidenebis(6-t-butyl-3-methylphenol) and 4,4'-thiobis(6-t-butyl-3-methylphenol).

Examples of the sulfur-based antioxidant include 3,3'-thiodipropionic acid di-n-dodecyl esters, 3,3'-thiodipropionic acid di-n-tetradecyl esters, 3,3'-thiodipropionic acid di-n-octadecyl esters and tetrakis(3-dodecylthiopropionic acid) pentaerythritol esters.

Examples of the phosphorus-based antioxidant include tris(2,4-di-t-butylphenyl)phosphite, bis(2,4-di-t-butylphenyl)pentaerythritol diphosphite, bis(2,6-di-t-butyl-4-methylphenyl)pentaerythritol diphosphite, bis(2,4-di-cumylphenyl)pentaerythritol diphosphite, tetrakis(2,4-di-t-butylphenyl)-4,4'-biphenylene diphosphonite and bis-[2,4-di-t-butyl-(6-methyl)phenyl]ethyl phosphite.

Examples of the hindered amine-based antioxidant include sebacic acid bis(2,2,6,6-tetramethyl-4-piperidyl)esters (melting point: 81 to 86° C.), 2,2,6,6-tetramethyl-4-piperidyl methacrylate (melting point: 58° C.), and poly[{6-(1,1,3,3-tetramethylbutyl)amino-1,3,5-triazine-2,4-diyl}{(2,2,6,6-tetramethyl-4-piperidyl)imino}-1,6-hexamethylene{(2,2,6,6-tetramethyl-4-piperidyl)imino}].

Examples of the rust inhibitor include alkanol amines such as triethanol amine; quaternary ammonium salts; alkanethiols; azoles such as imidazoline, imidazole, alkylimidazoline derivatives, benzimidazole, 2-mercaptobenzimidazole and benzotriazole; sodium metavanadate; bismuth citrate; phenol derivatives; amine compounds such as aliphatic amines including alkylamines and polyalkenylamines, aromatic amines, ethoxylated amines, cyanoalkylamines, cyclohexylamine benzoate, aliphatic diamines such as alkylenediamines, and aromatic diamines; amides of the amine compounds and carboxylic acid; alkyl esters; pyrimidine; naphthenic acid; sulfonic acid composites; nitrous acid salts such as calcium nitrite, sodium nitrite and dicyclohexylamine nitrite; polyol compounds such as polyalcohols and polyphenols; heteropolyacid salts such as sodium molybdate, sodium tungstate, sodium phosphonate, sodium chromate and sodium silicate; gelatin; polymers of carboxylic acid; nitro compounds; formaldehyde; acetylene alcohol; thiol compounds such as aliphatic thiols, aromatic thiols and acetylene thiols; sulfide compounds such as aliphatic sulfide, aromatic sulfide and acetylene sulfide; sulfoxide compounds such as sulfoxide and dibenzylsulfoxide; thio urea; combinations of an amine or quaternary ammonium salt and halogen ions; combinations of an alkylamine and potassium iodide; combinations of tannin and sodium phosphate; combinations of triethanolamine and laurylsarcosine; combinations of triethanolamine, laurylsarcosine and benzotriazole; and combinations of an alkylamine, benzotriazole, sodium nitrite and sodium phosphate.

Examples of the ultraviolet absorber/light stabilizer include 2-(5-methyl-2-hydroxyphenyl)benzotriazole, 2-[2-hydroxy-3,5-bis(α,α-dimethylbenzyl)phenyl]-2H-benzotriazole, 2-(3-t-butyl-5-methyl-2-hydroxyphenyl)-5-chlorobenzotriazole, 2-(2'-hydroxy-5'-t-octylphenyl)benzotriazole, condensation products of methyl-3-[3-t-butyl-5-(2H-benzotriazol-2-yl)-4-hydroxyphenyl]propionate-polyethylene glycol (molecular weight: about 300), hydroxyphenyl benzotriazole derivatives, 2-(4,6-diphenyl-1,3,5-triazin-2-yl)-5[(hexyl)oxy]-phenol and 2-ethoxy-2'-ethyl-oxalic acid bisanilide.

Examples of the antifungal agent/antibacterial agent include 2-(4-thiazolyl)benzimidazole, sorbic acid, 1,2-benzisothiazolin-3-one, (2-pyridylthio-1-oxide)sodium, dehydroacetic acid, 2-methyl-5-chloro-4-isothiazolone complexes, 2,4,5,6-tetrachlorophthalonitrile, methyl 2-benzimidazolecarbamate, methyl 1-(butylcarbamoyl)-2-benzimidazolecarbamate, mono- or dibromocyanoacetamides, 1,2-dibromo-2,4-dicyanobutane, 1,1-dibromo-1-nitropropanol and 1,1-dibromo-1-nitro-2-acetoxypropane.

Examples of the organism deposition preventing agent include tetramethylthiuram disulfide, zinc bis(N,N-dimethyldithiocarbamate), 3-(3,4-dichlorophenyl)-1,1-dimethylurea, dichloro-N-((dimethylamino)sulfonyl)fluoro-N—(P-tryl)methanesulpheneamide, pyridine-triphenylborane, N,N-dimethyl-N'-phenyl-N'-(fluorodichloromethylthio)sulfamide, cuprous thiocyanate (1), cuprous oxide, tetrabutylthiuram disulfide, 2,4,5,6-tetrachloroisophthalonitrile, zinc ethylenebisdithiocarbamate, 2,3,5,6-tetrachloro-4-(methylsulfonyl)pyridine, N-(2,4,6-trichlorophenyl)maleimide, bis(2-pyridinethiol-1-oxide)zinc salts, bis(2-pyridinethiol-1-oxide)copper salts, 2-methylthio-4-t-butylamino-6-cyclopropylamino-s-triazine, 4,5-dichloro-2-n-octyl-4-isothiazolin-3-one, furanones, alkylpyridine compounds, gramine-based compounds and isonitrile compounds.

Examples of the deodorizer include organic acids such as lactic acid, succinic acid, malic acid, citric acid, maleic acid, malonic acid, ethylenediamine polyacetic acid, alkane-1,2-dicarboxylic acids, alkene-1,2-dicarboxylic acids, cycloalkane-1,2-dicarboxylic acids, cycloalkene-1,2-dicarboxylic acids and naphthalene sulfonic acid; fatty acid metals such as zinc undecylenate, zinc 2-ethyl hexanoate and zinc ricinoleate; metal compounds such as iron oxide, iron sulfate, zinc oxide, zinc sulfate, zinc chloride, silver oxide, copper oxide, metal (iron, copper or the like) chlorophyllin sodium, metal (iron, copper, cobalt or the like) phthalocyanine, metal (iron, copper, cobalt or the like) tetrasulfonic acid phthalocyanine, titanium dioxide and visible light-responsive titanium dioxide (nitrogen-doped-type or the like); cyclodextrins such as α-, β- or γ-cyclodextrin, methyl derivatives thereof, hydroxypropyl derivatives, glucosyl derivatives and maltosyl derivatives; and porous materials such as acrylic acid-based polymers including porous methacrylic acid polymers and porous acrylic acid polymers, aromatic-based polymers including porous divinylbenzene polymers, porous styrene-divinylbenzene-vinylpyridine polymers and porous divinylbenzene-vinylpyridine polymers, copolymers thereof, chitin, chitosan, activated carbon, silica gel, activated alumina, zeolite and ceramics.

Examples of the pigment include carbon black, titanium oxide, phthalocyanine-based pigments, quinacridone-based pigments, isoindolinone-based pigments, perylene or perinone-based pigments, quinophthalone-based pigments, diketopyrrolo-pyrrole-based pigments, dioxazine-based pigments, disazo-condensed-based pigments and benzimidazolone-based pigments.

Examples of the flame retardant include decabromobiphenyl, antimony trioxide, phosphorus-based flame retardants and aluminum hydroxide.

Examples of the antistatic agent include cationic surfactants of quaternary ammonium salt type; amphoteric surfactants of betaine type; anionic surfactants of alkyl phosphate type; cationic surfactants such as primary amine salts, secondary amine salts, tertiary amine salts, quaternary amine salts and pyridine derivatives; anionic surfactants such as sulfated oil, soap, sulfated ester oil, sulfated amide oil, sulfated ester salts of olefins, fatty alcohol sulfuric acid ester salts, alkylsulfuric acid ester salts, fatty acid ethyl sulfonic acid salts, alkylnaphthalene sulfonic acid salts, alkylbenzene sulfonic acid salts, succinic acid ester sulfonic acid salts and phosphoric acid ester salts; nonionic surfactants such as partial fatty acid esters of polyhydric alcohols, ethylene oxide adducts of fatty alcohols, ethylene oxide adducts of fatty acids, ethylene oxide adducts of fatty amino or fatty acid amides, ethylene oxide adducts of alkylphenols, ethylene oxide adducts of partial fatty acid esters of polyhydric alcohols and polyethylene glycol; and amphoteric surfactants such as carboxylic acid derivatives and imidazoline derivatives.

As additives, a lubricant, a filler, a plasticizer, a nucleating agent, an antiblocking agent, a foaming agent, an emulsifier, a brightening agent, a binder and the like may further coexist.

When these additives are contained, the content of the additives is preferably 0.1 to 70% by mass, more preferably 0.1 to 50% by mass, still more preferably 0.5 to 30% by mass, further preferably 2 to 15% by mass in the composition.

The content of the total of the organosilicon compound (a) and the metal compound (b) (the total of the organosilicon compound (a), the metal compound (b) and the solvent (c) when the solvent (c) is contained) is preferably not less than 60% by mass, more preferably not less than 75% by mass, still more preferably not less than 85% by mass, further preferably not less than 95% by mass in the composition.

Examples of the method for contacting the organosilicon compound (a) and the metal compound (b) with a substrate include a spin coating method, a dip coating method, a spray coating method, a roll coating method, a bar coating method and a die coating method, and a spin coating method or spray coating method is preferred. According to the spin coating method or spray coating method, the thickness of a film is easily adjusted.

Here, the composition may be further diluted as necessary. The dilution ratio is, for example, 2 to 100, preferably 5 to 50 with respect to the composition before dilution. As the dilution solvent, a solvent as shown as an example of the solvent (c) can be appropriately used.

When the composition is placed in air while being in contact with a substrate, moisture in the air is captured, so that the hydrolyzable group is hydrolyzed, and a siloxane backbone is formed to form a film. The placement may be performed at 40 to 250° C.

A substrate comprising the film of the present invention on the surface is also encompassed in the scope of the present invention. The substrate may be in the form of a flat surface or a curved surface, or may have a three-dimensional structure in which a large number of surfaces are combined. The substrate may be formed of an organic material or an inorganic material. Examples of the organic material include thermoplastic resins such as acrylic resin, polycarbonate resin, polyester resin, styrene resin, acryl-styrene copolymer resin, cellulose resin, polyolefin resin and polyvinyl alcohol resin; and thermosetting resins such as phenol resin, urea resin, melamine resin, epoxy resin, unsaturated polyester, silicone resin and urethane resin. Examples of the inorganic material include ceramics; glass; metals such as iron, silicon, copper, zinc and aluminum; and alloys including the above metals.

The substrate may be subjected to an easy adhesion treatment beforehand. Examples of the easy adhesion treatment include hydrophilization treatments such as a corona treatment, a plasma treatment and an ultraviolet-ray treatment. A primer treatment with a resin, a silane coupling agent, a tetraalkoxysilane or the like may also be employed.

The primer layer is preferably a layer formed from a primer layer forming composition containing a component (P) capable of forming a siloxane backbone (hereinafter, sometimes referred to as a component (P)). The primer layer forming composition preferably contains, as the component (P), a component (P1) composed of a compound represented by the following formula (Pa) (hereinafter, sometimes referred to as a compound (Pa)), and/or a partial hydrolysis condensation product thereof.

$$Si(X^{P2})_4 \qquad (Pa)$$

wherein $X^{P2}$ represents a halogen atom, an alkoxy group or an isocyanato group.

In the formula (Pa), $X^{P2}$ is preferably a chlorine atom, an alkoxy group with a carbon atom number of 1 to 4, or isocyanato group, and four $X^{P2}$ are preferably the same.

One or two or more of the compounds (Pa) can be used, and $Si(NCO)_4$, $Si(OCH_3)_4$, $Si(OC_2H_5)_4$ or the like is preferred.

The component (P1) contained in the primer layer forming composition may be a partial hydrolysis condensation product of the compound (Pa). The partial hydrolysis condensation product of the compound (Pa) can be produced by a general hydrolysis condensation method using an acid catalyst or base catalyst. The degree of condensation (degree of polymerization) of the partial hydrolysis condensation product is preferably a degree which allows a product to be dissolved in a solvent. The component (Pa) may be the compound (Pa), or a partial hydrolysis condensation product of the compound (Pa), or may be a mixture of the compound (Pa) and a partial hydrolysis condensation product thereof, for example, a partial hydrolysis condensation product of the compound (Pa) containing an unreacted part of the compound (Pa). As the compound (Pa) or the partial hydrolysis condensation product, a commercial product can be used.

The primer layer forming composition may further contain, as the component (P), a component (P2) composed of a compound represented by the formula (Pb) (hereinafter, sometimes referred to as a compound (Pb)) and/or a partial hydrolysis condensation product thereof.

$$(X^{P3})_3Si-(CH_2)_p-Si(X^{P3})_3 \qquad (Pb)$$

wherein each of $X^{P3}$ independently represents a hydrolyzable group or a hydroxyl group, and p is an integer of 1 to 8.

Examples of the hydrolyzable group represented by $X^{P3}$ in the formula (Pb) include the same group or atom as $X^{P2}$. $X^{P3}$ is preferably an alkoxy group or isocyanato group, especially preferably an alkoxy group from the viewpoint of stability of the compound (Pb) and ease of hydrolysis.

The alkoxy group is preferably an alkoxy group with a carbon atom number of 1 to 4, more preferably a methoxy group or ethoxy group. A plurality of $X^{P3}$ existing in the compound (Pb) may be the same or different, and is preferably the same from the viewpoint of easy availability.

One or two or more of the compounds (Pb) can be used. Examples of the compound (Pb) include $(CH_3O)_3SiCH_2CH_2Si(OCH_3)_3$, $(OCN)_3SiCH_2CH_2Si(NCO)_3$, $Cl_3SiCH_2CH_2SiCl_3$, $(C_2H_5O)_3SiCH_2CH_2Si(OC_2H_5)_3$ and $(CH_3O)_3SiCH_2CH_2CH_2CH_2CH_2CH_2Si(OCH_3)_3$.

The component (P2) may be a partial hydrolysis condensation product of the compound (Pb). The partial hydrolysis condensation product of the compound (Pb) can be obtained by the same method as described in the production of the partial hydrolysis condensation product of the compound (Pa). The degree of condensation (degree of polymerization) of the partial hydrolysis condensation product is preferably a degree which allows a product to be dissolved in a solvent. The component (P2) may be the compound (Pb), or the partial hydrolysis condensation product of the compound (Pb), or may be a mixture of the compound (Pb) and a partial hydrolysis condensation product thereof, for example a partial hydrolysis condensation product of the compound (Pb) containing an unreacted part of the compound (Pb). As the compound (Pb) or the partial hydrolysis condensation product, a commercial product can be used.

The primer layer forming composition may contain, as the component (P), co-hydrolysis condensation product obtained by co-hydrolysis of the compound (Pb) and the compound (Pa), and may contain various kinds of polysilazanes.

The primer layer forming composition normally contains an organic solvent in addition to a solid as a layer forming component in consideration of economic efficiency, workability and ease of controlling the thickness of the obtained primer layer. The organic solvent is preferably capable of dissolving a solid contained in the primer layer forming composition. Examples of the organic solvent include the same solvents as in the solvent (C) for use in the composition. The organic solvent is not limited to one kind of solvent, and two or more solvents different in polarity, vaporization rate and so on may be mixed and used.

When the primer layer forming composition contains a partial hydrolysis condensation product and a partial hydrolysis co-condensation product, the primer layer forming composition may contain a solvent used for producing these condensation products.

Further, it is preferable that for accelerating a hydrolysis co-condensation reaction, a catalyst such as an acid catalyst which is similar to one that is generally used in a partial hydrolysis condensation reaction is blended even in a primer layer forming composition which does not contain a partial hydrolysis condensation product and a partial hydrolysis co-condensation product. In the case where the primer layer forming composition contains a partial hydrolysis condensation product and a partial hydrolysis co-condensation product, a catalyst is preferably blended when a catalyst used in these condensation products does not remain in the composition. The primer layer forming composition may contain water for carrying out a hydrolysis condensation reaction and hydrolysis co-condensation reaction of the contained component.

As a method for forming an under-layer using the primer layer forming composition, a known method with an organosilane compound-based surface treatment agent can be used. For example, the under-layer forming composition can be applied to a surface of a base by a method such as brush coating, flow coating, rotation coating, immersion coating, squeeze coating, spray coating or hand coating, dried as necessary in the air or a nitrogen atmosphere, and then cured to form the under-layer. Conditions for curing are appropriately controlled according to the kind, concentration and the like of a composition to be used. Curing of the primer layer forming composition may be performed concurrently with curing of the composition.

The thickness of the primer layer is not particularly limited as long as it ensures that moisture resistance, adhesion and barrier property to an alkali etc. from the substrate can be imparted to the film formed on the primer layer.

The film of the present invention has good durability against hot water, and is useful as a base material in display devices such as touch panel displays, optical elements, semiconductor elements, building materials, automobile components, nanoimprint techniques and so on. The film formed from the composition of the present invention is suitably used for articles such as bodies, window glass (windshield, side glass and rear glass), mirrors and bumpers in transportation equipment such as trains, automobiles, watercrafts and aircrafts. The film can also be used in outdoor applications such as building outer walls, tents, solar cell power generation modules, sound insulating boards and concrete. The film can also be used in fishing nets, bug catching nets and water tanks. Further, the film can also be used in various kinds of indoor equipment such as articles of members around kitchens, bathrooms, washbasins, mirrors and toilets, chandeliers, potteries such as tiles, artificial marbles, and air conditioners. Further, the film can also be used for antifouling treatment of tools, inner walls, pipes and so on in factories. The film is also suitable for goggles, glasses, helmets, pinball games, fibers, umbrellas, play equipment, soccer balls and so on. Further, the film can also be used as a deposition preventing agent for various kinds of packaging materials such as food packaging materials, cosmetic packaging materials and interiors of pots.

EXAMPLES

The present invention is hereinafter described in more detail in the following by way of Examples, however, the present invention is not limited to the following Examples, and modifications which do not depart from the spirit and scope of the present invention are allowed and embraced within the technical scope of the present invention. Hereinafter, "part" and "%" mean "part by mass" and "% by mass", respectively, unless otherwise noted.

Measurement of C/Si Ratio

The area intensity ratios of the peaks of O (1s), Ca (2p3/2), C (1s) and Si (2p3/2) were measured using an X-ray photoelectron spectrometer ("JPS-9010 MC" manufactured by JEOL Ltd.). The measurement conditions were as follows.

X ray: Mg Kα
Current: 10 kV
Voltage: 10 mA
Pass energy: 10 eV
Flood gun: 2.0 mA/2.0 V
Step: 0.1 eV
Dwell time: 50 ms
Charge correction: corrected with the peak of C1s as 285 eV Contact Angle Evaluation The contact angle of water on a film surface was measured by a liquid droplet method (analysis method: θ/2 method) using DM 700 manufactured by Kyowa Interface Science Co., LTD. The amount of water droplets is 3.0 µL.

Adhesion Evaluation

A sample was immersed in ion-exchanged water of 70° C. for 24 hours, and the contact angle of water was measured before and after the immersion.

Measurement of Contact Angle Hysteresis and Sliding Angle

The dynamic water repellency (contact angle hysteresis and sliding angle) of a film surface was measured by a slide-falling method (analysis method: contact method, amount of water droplets: 6.0 µL, amount of oil droplets: 4.0 µL, tilting method: continuous tilting, slide-falling detection: after slide-falling, movement determination: advancing angle, slide-falling determination distance: 0.125 mm) using DM 700 manufactured by Kyowa Interface Science Co., LTD.

Synthesis Example 1

A three-neck flask was charged with 4.69 g of tris(trimethylsiloxy)silanol and 21.0 g of THF, and the mixture was stirred. The mixture was cooled to −40° C., and 9.38 mL of a solution of n-BuLi in hexane (1.6 mol/L) was added dropwise. The mixture was heated to 0° C., 10.01 g of hexamethylcyclotrisiloxane dissolved in 21 g of THF was added dropwise, and the mixture was stirred for 17 hours. The mixture was cooled to −40° C., the reaction solution was separated by the sequential addition of THF (tetrahydrofuran), ion-exchanged water and hexane, and the organic layer was isolated. The organic layer was washed with ion-exchanged water, dried over anhydrous magnesium sulfate, and then concentrated under reduced pressure to obtain a clear colorless intermediate 1.

To 9.47 g of the intermediate 1 were added 8.97 g of TMOS (tetramethoxysilane) and 151.2 of t-butylamine, and the mixture was reacted at 30° C. for 5 hours with stirring. The product was concentrated under reduced pressure at 140° C. at 12 hPa to obtain a compound 1. The average number of the repeating units parenthesized in the formula was calculated from a NMR spectrum and was consequently 3.

[Formula 26]

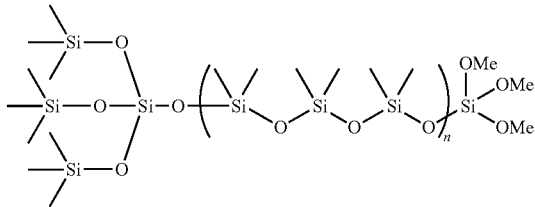

Synthesis Example 2

A three-neck flask was charged with 1.56 g of tris(trimethylsiloxy)silanol and 7.0 g of THF, and the mixture was stirred. The mixture was cooled to −40° C., and 3.13 mL of a solution of n-BuLi in hexane (1.6 mol/L) was added dropwise. The mixture was heated to 0° C., 8.90 g of hexamethylcyclotrisiloxane dissolved in 7 g of THF was added dropwise, and the mixture was stirred for 17 hours. The mixture was cooled to −40° C., the reaction solution was separated by the sequential addition of THF, ion-exchanged water and hexane, and the organic layer was isolated. The organic layer was washed with ion-exchanged water, dried over anhydrous magnesium sulfate, and then concentrated under reduced pressure to obtain a clear colorless intermediate 2.

To 9.9 g of the intermediate 2 were added 4.49 g of TMOS and 75.6 µL of t-butylamine, and the mixture was reacted at 30° C. for 5 hours with stirring. The product was concentrated under reduced pressure at 140° C. at 12 hPa to obtain a compound 2. The average number of the repeating units parenthesized in the formula was calculated from a NMR spectrum and was consequently 8.

[Formula 27]

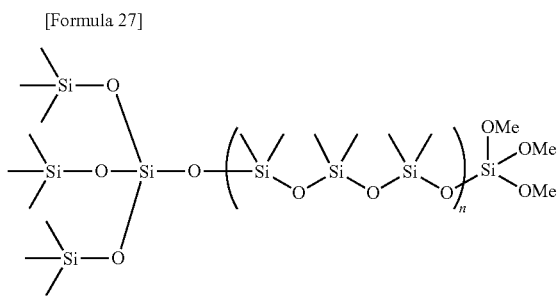

Synthesis Example 3

A four-neck flask was charged with 0.45 g of trimethylsilanol and 5.1 mL of THF, and the mixture was stirred. The mixture was cooled to −40° C., and 3.13 mL of a solution of n-BuLi in hexane (1.6 mol/L) was added dropwise. The mixture was heated to 0° C., 16.68 g of hexamethylcyclotrisiloxane dissolved in 11.9 mL of THF was added dropwise, and the mixture was heated to room temperature and stirred for 17 hours. The mixture was cooled to −40° C., and 0.99 g of chlorotriethoxysilane was added dropwise. Hexane was added, and the mixture was filtered. The filtrate was concentrated at 25° C. at 130 hPa to obtain 16.33 g of a compound 3. The average number of the repeating units parenthesized in the formula was calculated from a NMR spectrum and was consequently 15.

[Formula 28]

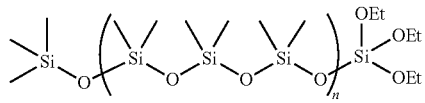

Synthesis Example 4

A four-neck flask was charged with 1.6 g of trimethylsilanol and 8 mL of THF, and the mixture was stirred. The mixture was cooled to −40° C., and 11.1 mL of a solution of n-BuLi in hexane (1.6 mol/L) was added dropwise. The mixture was heated to 0° C., 31.68 g of hexamethylcyclotrisiloxane dissolved in 28 mL of THF was added dropwise, and the mixture was heated to room temperature and stirred for 17 hours. The reaction solution was separated by the sequential addition of THF, ion-exchanged water and hexane, and the organic layer was isolated. The organic layer was washed with ion-exchanged water, dried over anhydrous magnesium sulfate, and then concentrated under reduced pressure to obtain 32 g of a clear colorless intermediate 4.

To 10 g of the intermediate 4 were added 4.8 g of TMOS and 56 mg of t-butylamine, and the mixture was reacted at 30° C. for 5 hours with stirring. The product was concentrated under reduced pressure at 140° C. at 12 hPa to obtain 10.6 g of a compound 4. The average number of the repeating units parenthesized in the formula was calculated from a NMR spectrum and was consequently 8.

[Formula 29]

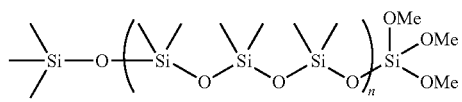

Examples 1 and 2 and Comparative Examples 1 to 3

Each of the compounds 1 to 4 as the organosilicon compound (a), tetraethoxysilane (TEOS) as the metal compound (b), 0.01 M hydrochloric acid and methyl ethyl ketone (MEK) were mixed according to the composition as shown in Table 7, and stirred for 24 hours to prepare sample solutions. Each of the obtained sample solutions was further diluted by 20 times with methyl ethyl ketone (MEK) to obtain coating solutions 1 to 4.

TABLE 7

| | | | Example | | | Comparative Example | | |
|---|---|---|---|---|---|---|---|---|
| | | | 1 | 2 | 3 | 1 | 2 | 3 |
| Organosilicon compound (a) | Compound 1 | mL | 0.28 | | | | | |
| | | mmol | 0.22 | | | | | |
| | Compound 2 | mL | | 0.20 | 0.20 | | | |
| | | mmol | | 0.08 | 0.08 | | | |
| | Compound 3 | mL | | | | 0.20 | | |
| | | mmol | | | | 0.05 | | |
| | Compound 4 | mL | | | | | 0.20 | 0.40 |
| | | mmol | | | | | 0.09 | 0.18 |
| Metal compound (b) | Tetraethoxysilane | mL | | 0.24 | | 0.24 | 0.24 | 0.24 |
| | | mL | 0.56 | 0.28 | 0.12 | 0.15 | 0.40 | |
| | | mmol | 2.69 | 1.34 | 0.69 | 0.72 | 1.92 | |
| (B)/(A) in terms of moles | | | | 16.90 | | 14.69 | 21.72 | 0.00 |
| Solvent (c) | MEK | mL | 12.0 | 7.20 | 4.80 | 5.10 | 8.50 | 7.80 |
| | | g | 9.66 | 5.80 | 3.86 | 4.11 | 6.84 | 6.28 |
| Catalyst (d) | 0.01M hydrochloric acid | g | 5.00 | 2.45 | 1.57 | 2.00 | 3.40 | 0.25 |

Film Formation

An alkali-treated glass substrate (EAGLE XG manufactured by Corning Incorporated) was coated with each of the coating solutions 1 to 4 at 3000 rpm for 20 seconds using a spin coater (manufactured by MIKASA Corporation), and the resulting product was placed at room temperature. The film formation did not require a wiping step and was able to produce films conveniently. The obtained films were evaluated for their initial contact angles, abrasion resistance and liquid droplet slide behavior. A hot water immersing test was conducted, and then, the samples were evaluated for their contact angles, abrasion resistance and liquid droplet slide behavior. The results are shown in Table 8. In Table 8, "-" represents that it was immeasurable.

TABLE 8

|  |  |  | Example | | | Comparative Example | | |
|---|---|---|---|---|---|---|---|---|
|  |  |  | 1 | 2 | 3 | 1 | 2 | 3 |
| Initial | Contact angle (water) | ° | 102.0 | 103.8 | 100.2 | 101.7 | 99.3 | 103.5 |
|  | Sliding angle (water) | ° | 17.7 | 13.0 | 13.4 | 31.7 | 46.3 | 35.7 |
|  | Contact angle hysteresis (water) | ° | 7.7 | 2.9 | 7.8 | 8.6 | 12.2 | 10.9 |
| After hot water test | Contact angle | ° | 102.0 | 101.5 | 100.0 | 83.0 | 84.2 | 89.3 |
|  | Contact angle change ratio | % | 0.0 | −2.2 | −0.2 | −16.4 | −15.2 | −13.7 |
|  | Sliding angle (water) | ° | 25.0 | 24.8 | 28.5 | 50< | 50< | 50< |
|  | Contact angle hysteresis (water) | ° | 7.5 | 7.4 | 9.4 | — | — | — |

TABLE 9

| Molar ratio |  | Example | | | Comparative Example | | |
|---|---|---|---|---|---|---|---|
|  |  | 1 | 2 | 3 | 1 | 2 | 3 |
| O 1s | atom % | 36.6 | 34.8 | 34.3 | 39.6 | 42.0 | 29.4 |
| Ca 2p3/2 | atom % | 0.0 | 0.0 | 0.0 | 0.0 | 0.0 | 0.0 |
| C 1s | atom % | 32.7 | 34.7 | 36.0 | 29.1 | 26.8 | 40.9 |
| Si 2p3/2 | atom % | 30.7 | 30.5 | 29.7 | 31.4 | 31.2 | 29.7 |
| C/Si | — | 1.07 | 1.14 | 1.21 | 0.92 | 0.86 | 1.38 |

Results of elemental analysis by XPS are shown in Table 9.

If a film thickness is too small or the angle of incidence of X ray is too large at the time of measurement, it is possible that signals not only from the film but from the substrate are detected. Such analysis involving signals from both the substrate and the film cannot be regarded as the analysis of a film surface and requires properly adjusting analysis conditions. Whether the analysis conditions are proper can be confirmed by, for example, the presence or absence of the detection of elements in the substrate (this time, calcium atoms in the glass substrate). No calcium atom was detected in the results of analysis conducted this time, and therefore it can be concluded that the analysis of only the film was able to be correctly conducted.

INDUSTRIAL APPLICABILITY

The film of the present invention has good durability against hot water, and is useful as a substrate in display devices such as touch panel displays, optical elements, semiconductor elements, building materials, automobile components, nanoimprint techniques and so on. The film formed from the composition of the present invention is suitably used for articles such as bodies, window glass (windshield, side glass and rear glass), mirrors and bumpers in transportation equipment such as trains, automobiles, watercrafts and aircrafts. The film can also be used in outdoor applications such as building outer walls, tents, solar cell power generation modules, sound insulating boards and concrete. The film can also be used in fishing nets, bug catching nets and water tanks. Further, the film can also be used in various kinds of indoor equipment such as articles of members around kitchens, bathrooms, washbasins, mirrors and toilets, chandeliers, potteries such as tiles, artificial marbles, and air conditioners. Further, the film can also be used for antifouling treatment of tools, inner walls, pipes and so on in factories. The film is also suitable for goggles, glasses, helmets, pinball games, fibers, umbrellas, play equipment, soccer balls and so on. Further, the film can also be used as a deposition preventing agent for various kinds of packaging materials such as food packaging materials, cosmetic packaging materials and interiors of pots.

The invention claimed is:

1. A film comprising a polydialkylsiloxane backbone, wherein the ratio of carbon atoms to silicon atoms (C/Si) measured by X-ray photoelectron spectroscopy is not less than 0.93 and less than 1.38.

2. A film comprising a polydialkylsiloxane backbone,
wherein the ratio of carbon atoms to silicon atoms (C/Si) measured by X-ray photoelectron spectroscopy is not less than 0.93 and less than 1.38, and
wherein a reduction in the magnitude of a contact angle change ratio dw represented by the following formula is no more than −10%:

contact angle change ratio $d_W(\%)=(\theta_W-\theta_0)/\theta_0\times100$ provided that $\theta_0$ is an initial contact angle of water, and $\theta_W$ is a contact angle of water on the film immersed in ion-exchanged water of 70° C. for 24 hours.

3. A film comprising a polydialkylsiloxane backbone,
wherein the ratio of carbon atoms to silicon atoms (C/Si) measured by X-ray photoelectron spectroscopy is not less than 0.93 and less than 1.38 and
wherein the initial sliding angle of water is not more than 30°.

4. A film comprising a polydialkylsiloxane backbone including a group represented by the formula (s1-1):

[Formula 1]

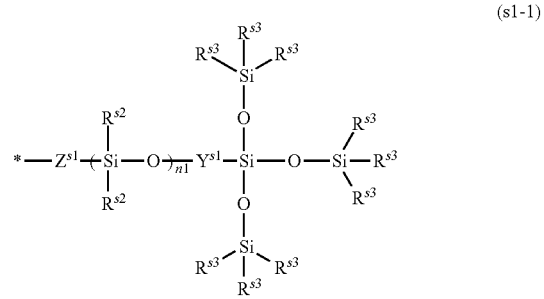

(s1-1)

wherein $R^{s2}$ represents an alkyl group with a carbon atom number of 1 to 4; $R^{s3}$ represents an alkyl group with a carbon atom number of 1 to 4; $Z^{s1}$ represents —O— or a divalent hydrocarbon group and –$CH_2$— contained in the divalent hydrocarbon group may be replaced by —O—; $Y^{s1}$ represents a single bond or —Si($R^{s2}$)$_2$-$L^{s1}$-; $L^{s1}$ represents a divalent hydrocarbon group and —CH$_2$— contained in the divalent hydrocarbon group may be replaced by —O—; and n1 represents an integer of not less than 1, wherein the ratio of carbon atoms to silicon atoms (C/Si) measured by X-ray photoelectron spectroscopy is not less than 0.93 and less than 1.38.

5. The film according to claim 1, wherein the content ratio of silicon atoms derived from the polydialkylsiloxane backbone is not more than 70% by mol in silicon atoms contained in the film.

6. A film comprising a polydialkylsiloxane backbone and including a trialkylsilyl group, wherein the content ratio of silicon atoms derived from the trialkylsilyl group is not less than 5% by mol in silicon atoms contained in the film, and
wherein the ratio of carbon atoms to silicon atoms (C/Si) measured by X-ray photoelectron spectroscopy is not less than 0.93 and less than 1.38.

\* \* \* \* \*